(12) United States Patent
Park et al.

(10) Patent No.: US 12,294,533 B2
(45) Date of Patent: May 6, 2025

(54) MAXIMUM SENSITIVITY DEGRADATION FOR CARRIER AGGREGATION

(71) Applicant: LG ELECTRONICS INC., Seoul (KR)

(72) Inventors: Jongkeun Park, Seoul (KR); Suhwan Lim, Seoul (KR); Yoonoh Yang, Seoul (KR); Sangwook Lee, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 298 days.

(21) Appl. No.: 17/759,878

(22) PCT Filed: Feb. 15, 2021

(86) PCT No.: PCT/KR2021/001898
§ 371 (c)(1),
(2) Date: Aug. 1, 2022

(87) PCT Pub. No.: WO2021/162518
PCT Pub. Date: Aug. 19, 2021

(65) Prior Publication Data
US 2023/0155751 A1 May 18, 2023

(30) Foreign Application Priority Data

Feb. 11, 2020 (KR) .......................... 10-2020-0016551

(51) Int. Cl.
*H04L 5/00* (2006.01)
(52) U.S. Cl.
CPC .............. *H04L 5/001* (2013.01); *H04L 5/006* (2013.01)

(58) Field of Classification Search
CPC ...... H04L 5/0007; H04L 5/001; H04L 5/0053; H04L 5/0058; H04L 5/006; H04L 5/14
(Continued)

(56) References Cited

U.S. PATENT DOCUMENTS

2017/0054535 A1\* 2/2017 Lim .................... H04J 11/0023
2017/0318587 A1\* 11/2017 Lim ........................ H04L 5/001
(Continued)

OTHER PUBLICATIONS

PCT International Application No. PCT/KR2021/001898, International Search Report dated May 20, 2021, 3 pages.
(Continued)

*Primary Examiner* — Robert J Lopata
(74) *Attorney, Agent, or Firm* — LEE, HONG, DEGERMAN, KANG & WAIMEY

(57) ABSTRACT

One general aspect of the present disclosure includes a device configured to operate in a wireless system. The device including: a transceiver configured with a plurality of Evolved UMTS (Universal Mobile Telecommunications System) Terrestrial Radio Access (E-UTRA) operating bands; and a processor operably connectable to the transceiver, the processer is configured to: control the transceiver to transmit an uplink signal via two bands among the plurality of E-UTRA operating bands, wherein the two bands are configured for uplink carrier aggregation (CA), and consists of a first band and a second band; and control the transceiver to receive a downlink signal via one or more band from the three bands among the plurality of E-UTRA operating bands, wherein the three bands are configured for downlink CA, are consists of the first band, the second band, and a third band.

3 Claims, 23 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0230663 | A1* | 7/2019 | Lim | H04W 72/0453 |
| 2020/0015097 | A1* | 1/2020 | Kazmi | H04W 4/70 |
| 2020/0313812 | A1* | 10/2020 | Park | H04L 5/001 |
| 2021/0091799 | A1* | 3/2021 | Park | H04L 5/001 |
| 2021/0376989 | A1* | 12/2021 | Lim | H04L 5/0092 |
| 2022/0255684 | A1* | 8/2022 | Park | H04B 17/3912 |

OTHER PUBLICATIONS

3rd Generation Partnership Project, "Technical Specification Group Radio Access Network; Evolved Universal Terrestrial Radio Access (E-UTRA); User Equipment (UE) radio transmission and reception (Release 16)," 3GPP TS 36.101 V16.4.0, Dec. 2019, 574 pages.

3rd Generation Partnership Project, "Technical Specification Group Radio Access Network; NR; User Equipment (UE) conformance specification; Radio transmission and reception; Part 3: Range 1 and Range 2 Interworking operation with other radios (Release 16)," 3GPP TS 38.521-3 V16.2.0, Dec. 2019, 558 pages.

3rd Generation Partnership Project, "Technical Specification Group Radio Access Network; Evolved Universal Terrestrial Radio Access (E-UTRA); Base Station (BS) radio transmission and reception (Release 16)," 3GPP TS 36.104 V16.4.0, Dec. 2019, 285 pages.

3rd Generation Partnership Project, "Technical Specification Group Radio Access Network; NR; User Equipment (UE) radio transmission and reception; Part 3: Range 1 and Range 2 Interworking operation with other radios (Release 16)," 3GPP TS 38.101-3 V16.2.1, Dec. 2019, 351 pages.

* cited by examiner

MAXIMUM SENSITIVITY DEGRADATION FOR CARRIER AGGREGATION

CROSS-REFERENCE TO RELATED APPLICATION(S)

This application is the National Stage filing under 35 U.S.C. 371 of International Application No. PCT/KR2021/001898, filed on Feb. 15, 2021, which claims the benefit of earlier filing date and right of priority to Korean Application No. 10-2020-0016551, filed on Feb. 11, 2020, the contents of which are all hereby incorporated by reference herein in their entireties.

TECHNICAL FIELD

The present disclosure generally relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

When a harmonics component and/or an intermodulation distortion (IMD) component occurs, there is a possibility that the REFSENS for the downlink signal may not be satisfied due to the uplink signal transmitted by the mobile device.

SUMMARY

Accordingly, a disclosure of the specification has been made in an effort to solve the aforementioned problem.

In accordance with an embodiment of the present disclosure, a disclosure of this specification provides a device configured to operate in a wireless system, the device comprising: a transceiver configured with a plurality of Evolved UMTS (Universal Mobile Telecommunications System) Terrestrial Radio Access (E-UTRA) operating bands; and a processor operably connectable to the transceiver, the processer is configured to: control the transceiver to transmit an uplink signal via two bands among the plurality of E-UTRA operating bands, wherein the two bands are configured for uplink carrier aggregation (CA), and consists of a first band and a second band; and control the transceiver to receive a downlink signal via one or more band from the three bands among the plurality of E-UTRA operating bands, wherein the three bands are configured for downlink CA, are consists of the first band, the second band, and a third band, wherein the plurality of E-UTRA operating bands include E-UTRA operating bands 2, 5, 13, 48, and 66, wherein the three bands include the two bands, wherein a pre-configured value of Maximum Sensitivity Degradation (MSD) is applied to a reference sensitivity of the third band.

According to a disclosure of the present disclosure, the above problem of the related art is solved.

Effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

DETAILED DESCRIPTION

Figure 1:
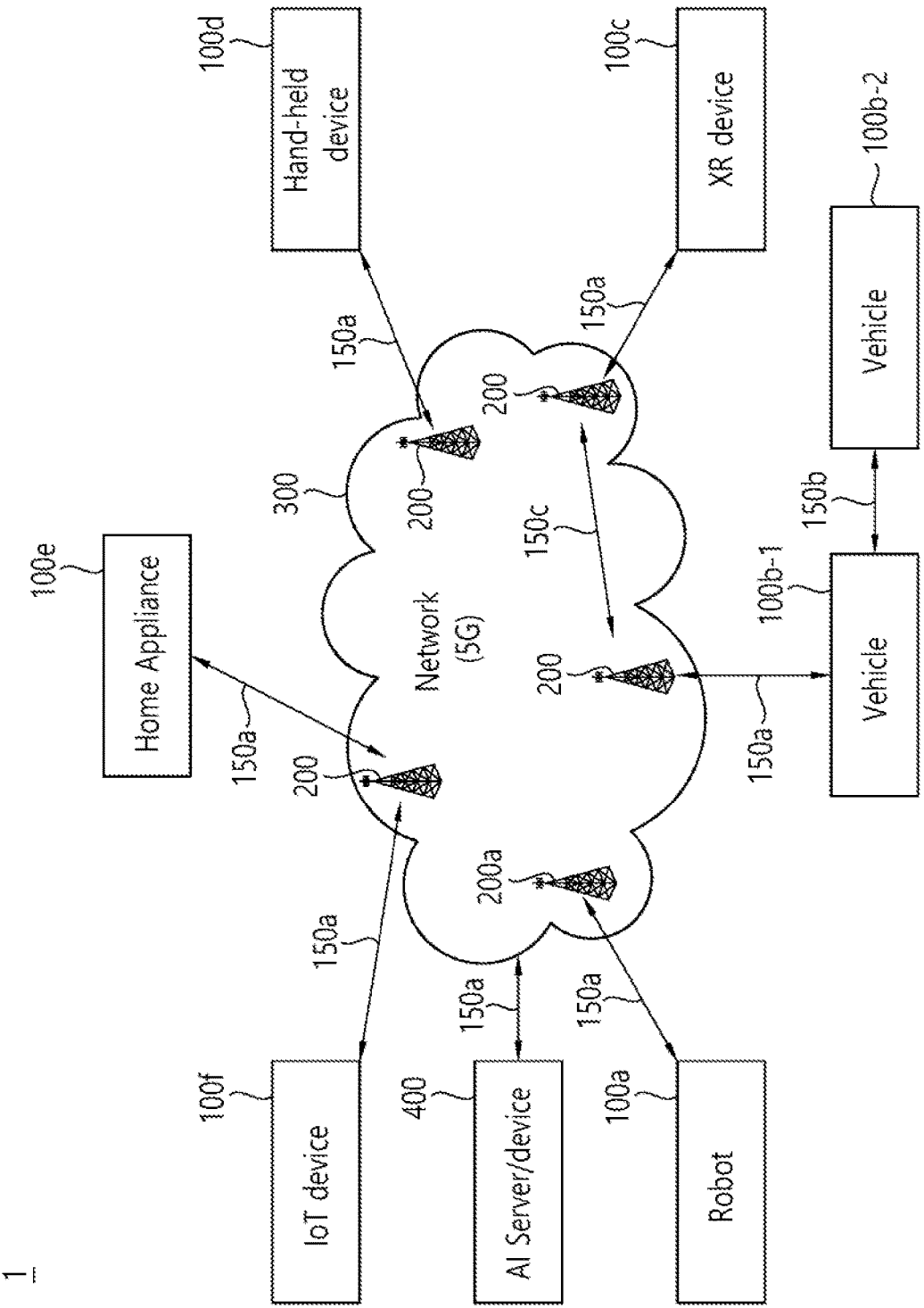
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information"

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles.

The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range Designation | Corresponding Frequency Range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range Designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
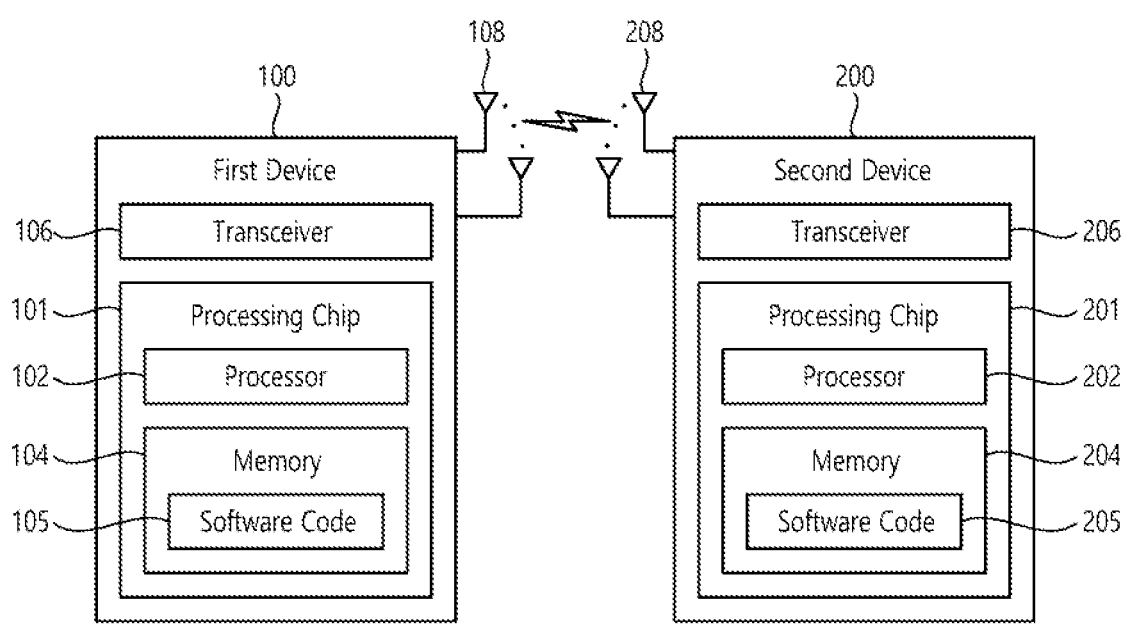
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
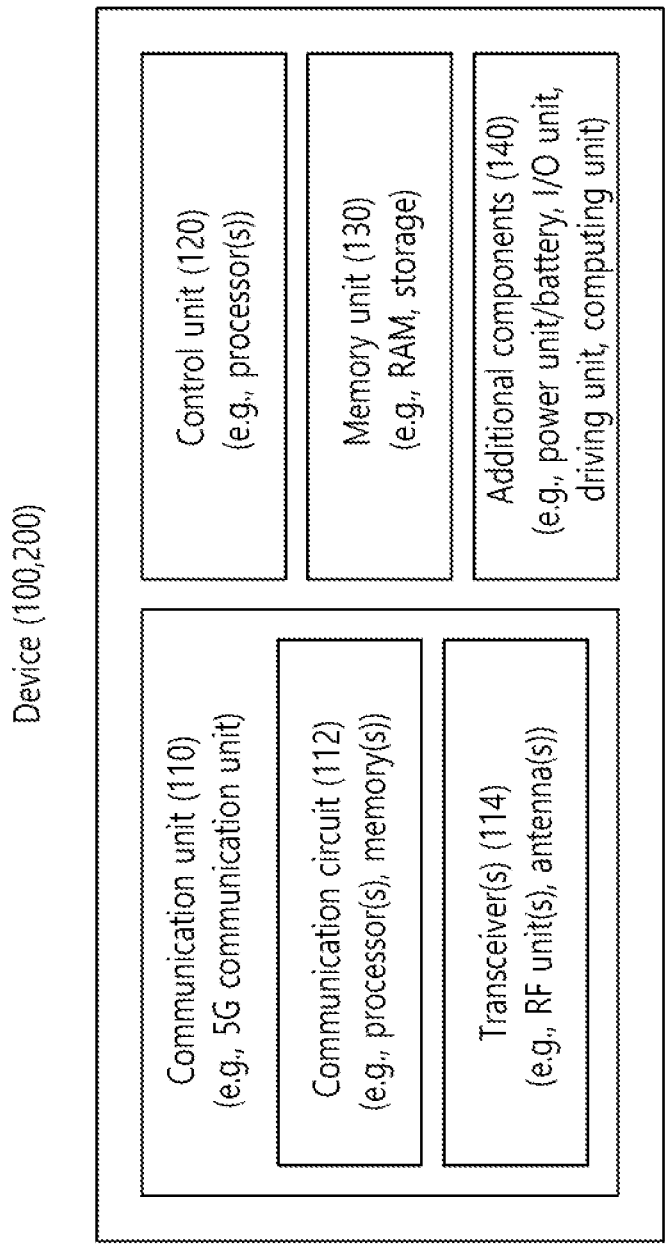
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
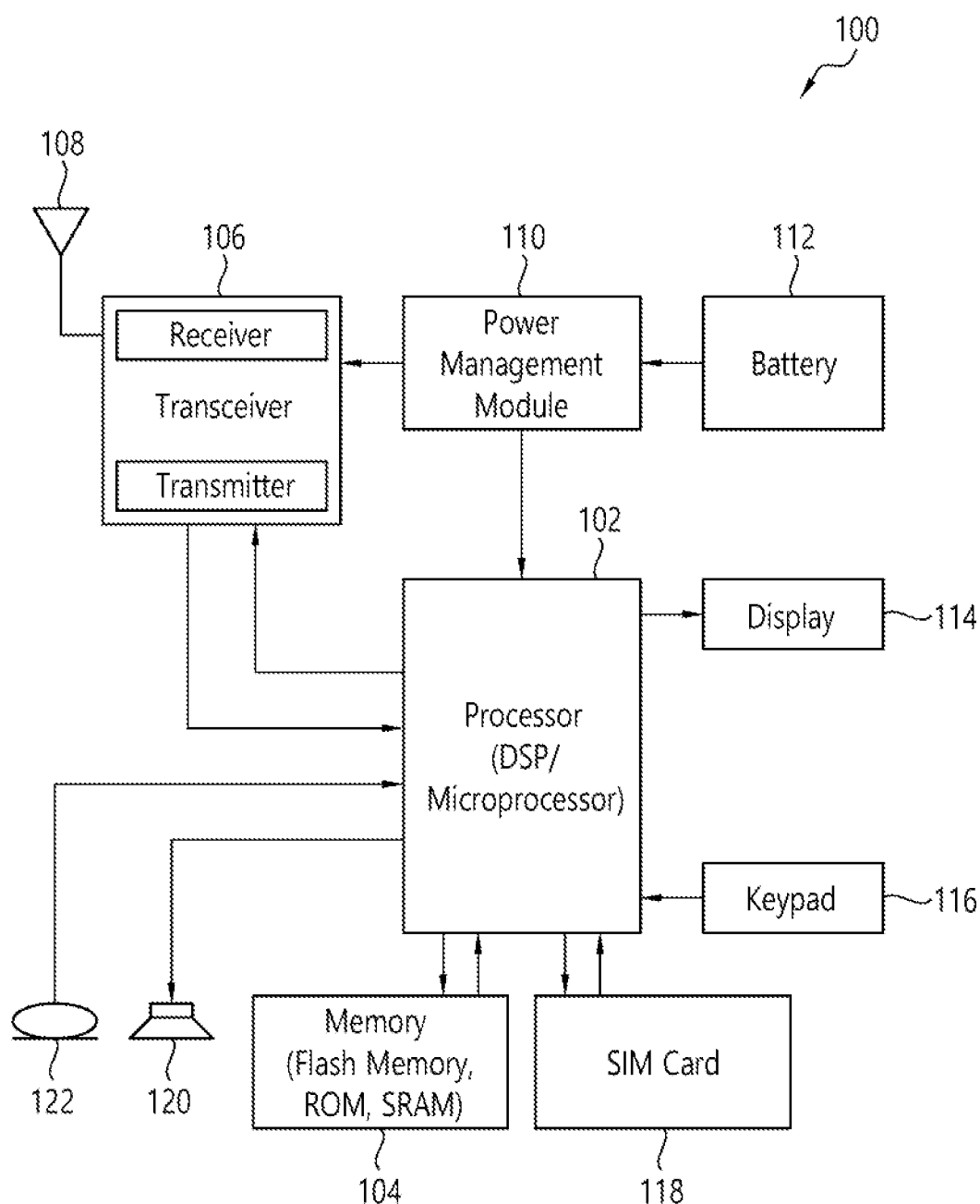
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
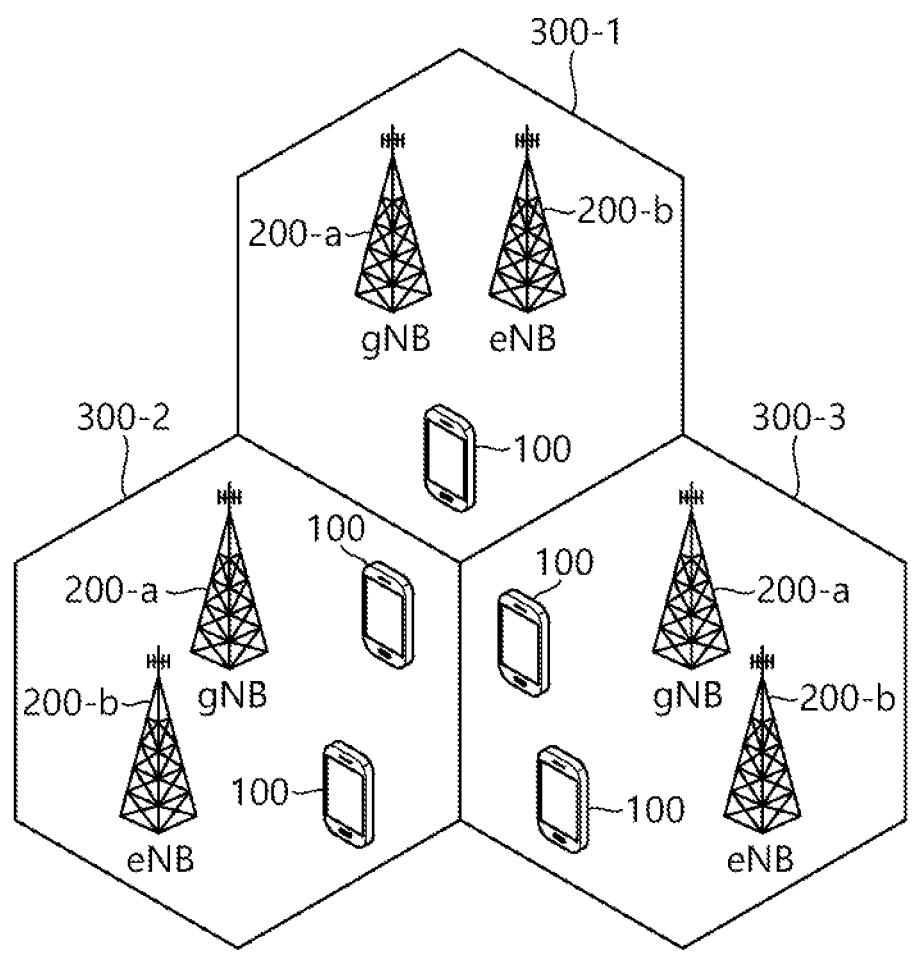
FIG. 5 illustrates an example of wireless communication system.

FIG. 5 illustrates an example of wireless communication system.

As seen with reference to FIG. 5, the wireless communication system includes at least one base station (BS). The BS is classified into a gNB 20a and an eNB 20b. The gNB 20a is for 5G mobile communication such as NR. And, the eNB 20b is for 4G mobile communication such as LTE or LTE-A.

Each BS (e.g., gNB 20a and eNB 20b) provides a communication service to specific geographical areas (generally, referred to as cells) 20-1, 20-2, and 20-3. The cell can be further divided into a plurality of areas (sectors).

The UE 10 generally belongs to one cell and the cell to which the UE belong is referred to as a serving cell. A BS that provides the communication service to the serving cell is referred to as a serving BS. Since the wireless communication system is a cellular system, another cell that neighbors to the serving cell is present. Another cell which neighbors to the serving cell is referred to a neighbor cell. A BS that provides the communication service to the neighbor cell is referred to as a neighbor BS. The serving cell and the neighbor cell are relatively decided based on the UE.

Hereinafter, a downlink means communication from the BS 20 to the UE 10 and an uplink means communication from the UE 10 to the BS 200. In the downlink, a transmitter may be a part of the BS 20 and a receiver may be a part of the UE 10. In the uplink, the transmitter may be a part of the UE 10 and the receiver may be a part of the BS 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Figure 6A:
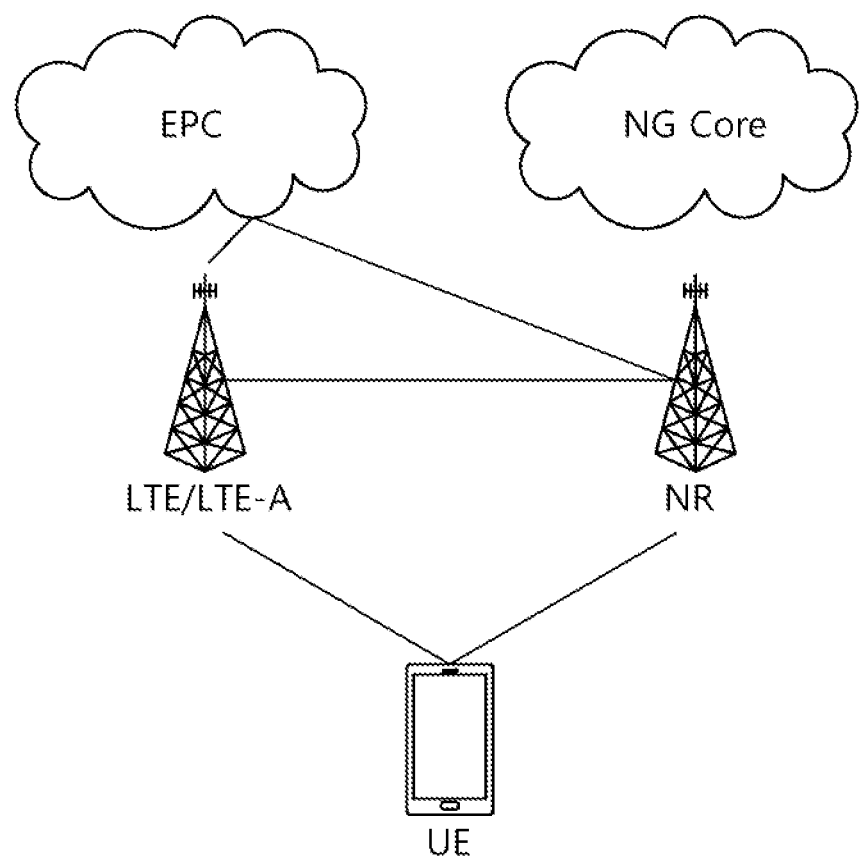
FIGS. 6a to 6c are exemplary diagrams illustrating exemplary architectures for services of the next generation mobile communication.
Figure 6B:
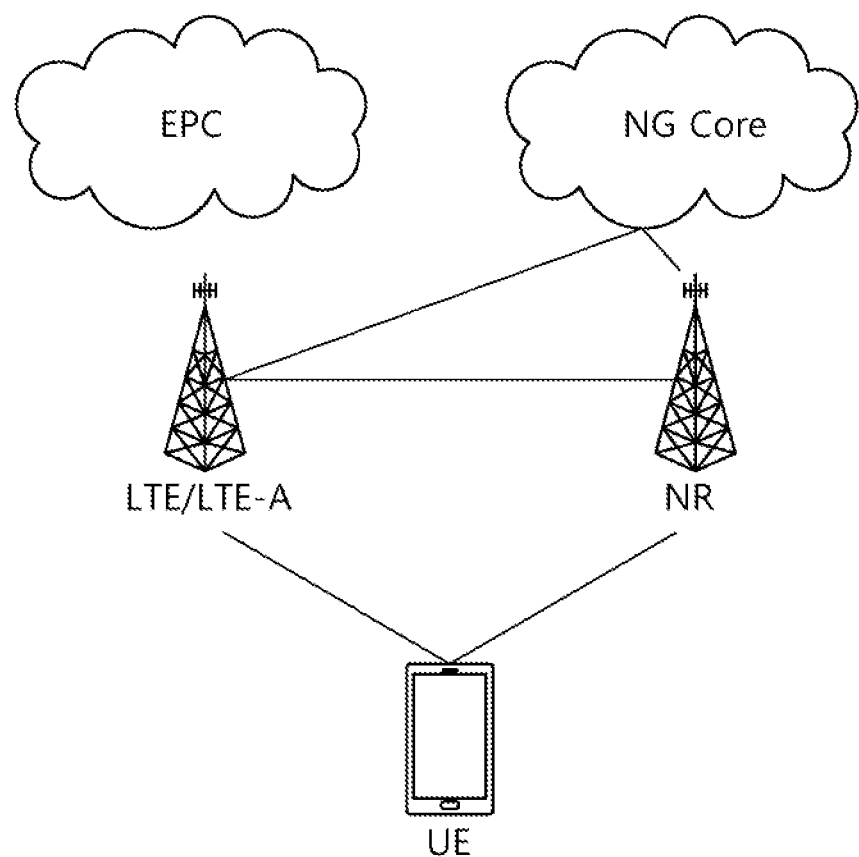
Figure 6C:
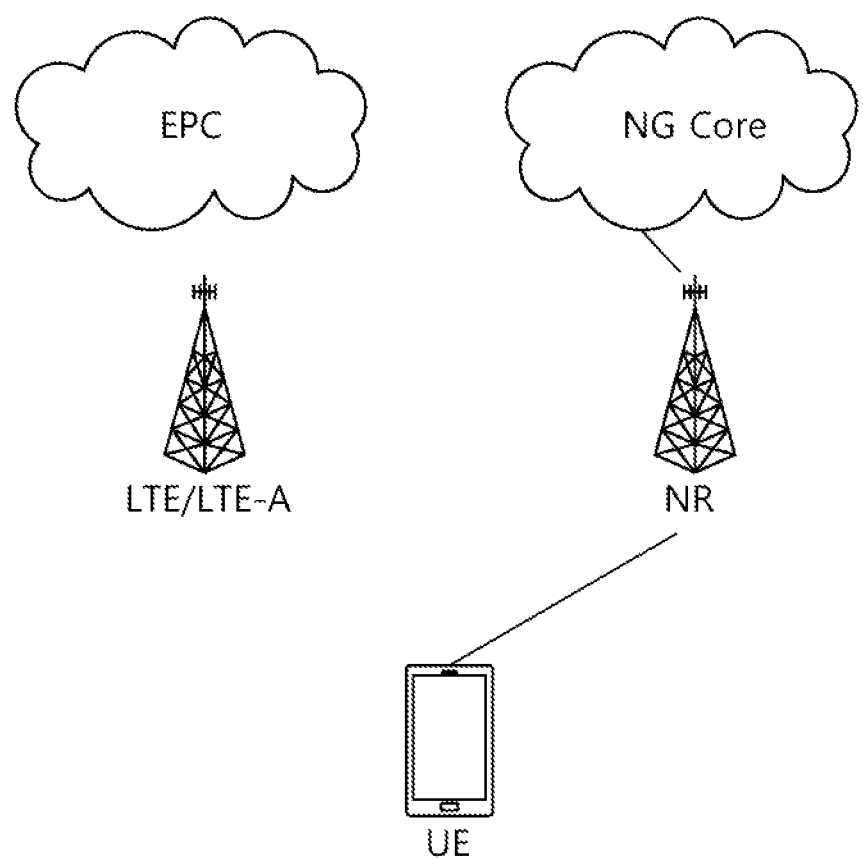

FIGS. 6a to 6c are exemplary diagrams illustrating exemplary architectures for services of the next generation mobile communication.

Referring to FIG. 6a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 6b, unlike FIG. 6a, the LTE/LTE-A based cell is connected to a core network for the 5G mobile communication, that is, a next generation (NG) core network.

The service scheme based on the architecture as illustrated in FIGS. 6a and 6b is called non-standalone (NSA).

Referring to FIG. 6c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 7:
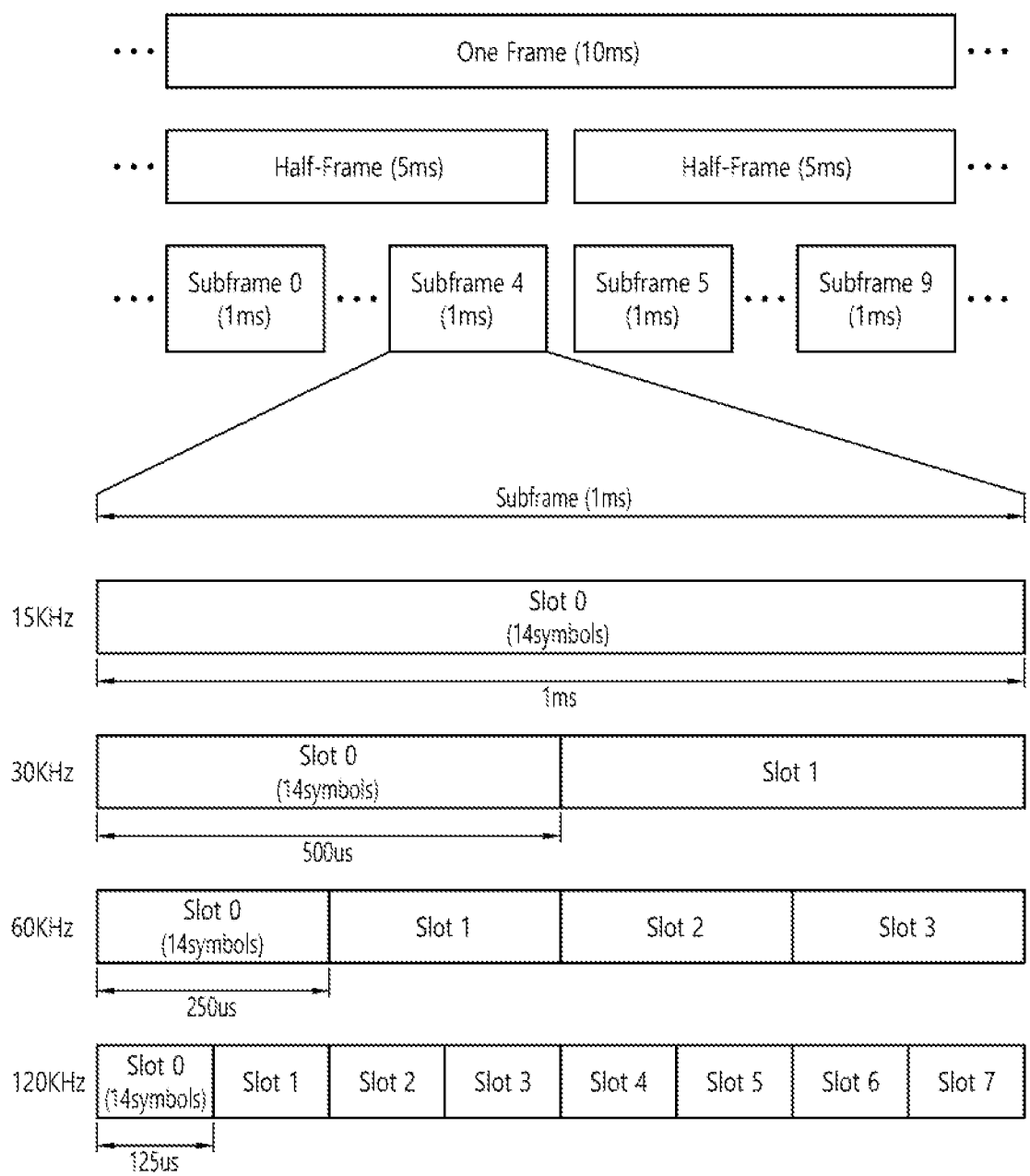
FIG. 7 illustrates an example of a structure of NR radio frame.

FIG. 7 illustrates an example of a structure of NR radio frame.

In the NR, the uplink and downlink transmission are based on radio frames. The radio frame has a length of 10 ms and may be defined as two 5 ms half-frames (HFs). The half-frame may be defined as five 1 ms subframes (SFs). The subframe is divided into one or more slots, and the number of slots in the subframe depends on the subcarrier spacing (SCS). Each slot includes 12 or 14 OFDM (A) symbols according to the cyclic prefix (CP). When the normal CP is used, each slot includes 14 symbols. When the extended CP is used, each slot includes 12 symbols. Here, the symbol may include an OFDM symbol (or CP-OFDM symbol) and an SC-FDMA symbol (or DFT-s-OFDM symbol).

Figure 8:
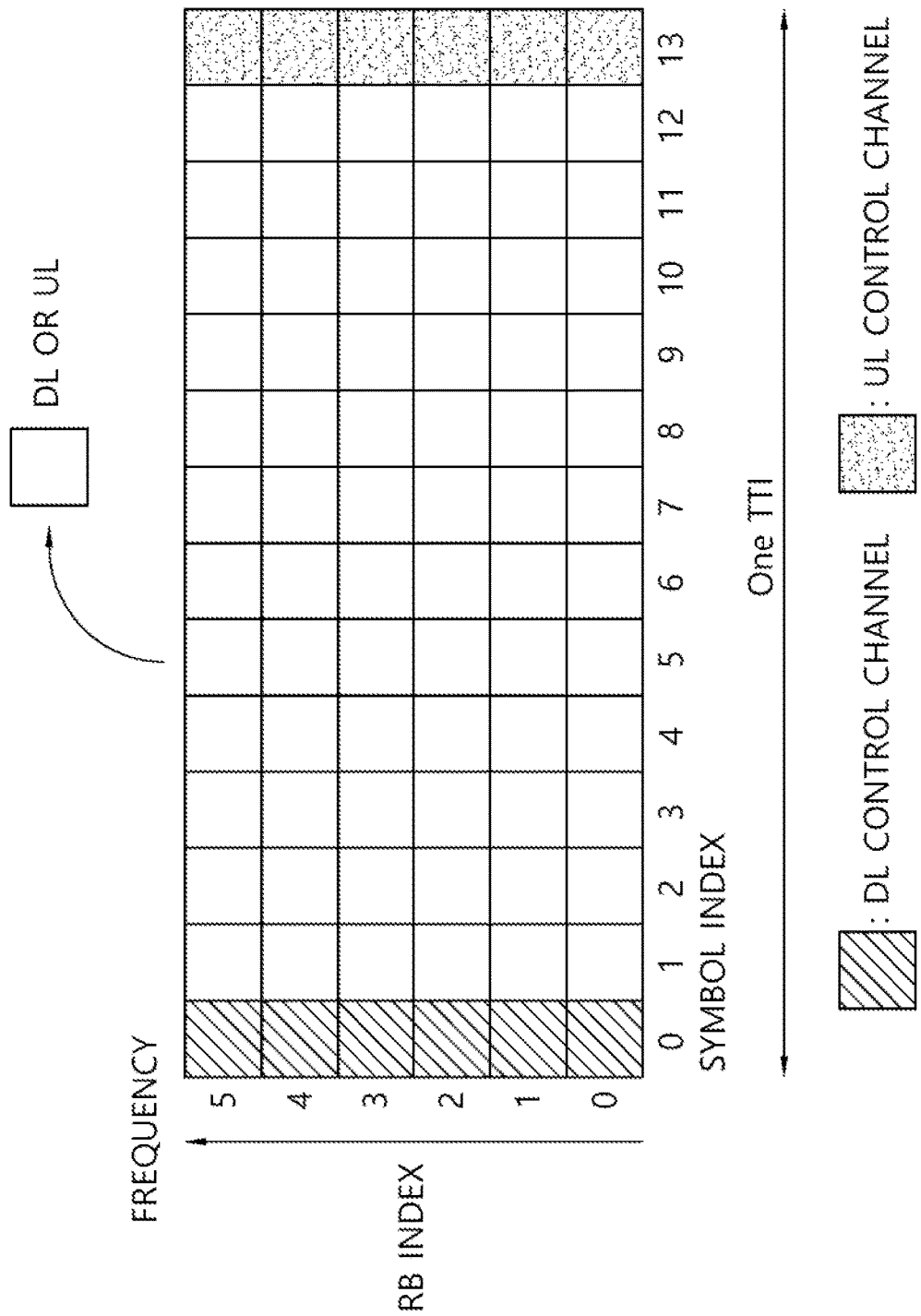
FIG. 8 shows an example of subframe type in NR.

FIG. 8 shows an example of subframe type in NR.

A transmission time interval (TTI) shown in FIG. 8 may be called a subframe or slot for NR (or new RAT). The subframe (or slot) in FIG. 8 may be used in a TDD system of NR (or new RAT) to minimize data transmission delay. As shown in FIG. 8, a subframe (or slot) includes 14 symbols as does the current subframe. A front symbol of the subframe (or slot) may be used for a downlink control channel, and a rear symbol of the subframe (or slot) may be used for an uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and an uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

Support of Various Numerologies

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by u, a subcarrier spacing and a corresponding CP length may be expressed as shown in the following table.

Table 3 exemplarily shows that when the normal CP is used, the number of symbols per slot, the number of slots per frame, and the number of slots per subframe vary according to the SCS.

TABLE 3

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: The number of symbols in slot.
*$N^{frame,u}_{slot}$: The number of slots in frame
*$N^{subframe,u}_{slot}$: The number of slots in subframe Table 4 exemplarily shows that when the extended CP is used, the number of symbols per slot, the number of slots per frame, and the number of slots per subframe vary according to the SCS.

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, OFDM (A) numerology (for example, SCS, CP length, and the like) may be set differently between a plurality of cells merged into one terminal. Accordingly, a (absolute time) section of a time resource (for example, SF, slot, or TTI) (commonly referred to as a time unit (TU) for convenience) composed of the same number of symbols may be set differently between the merged cells. Meanwhile, in the next-generation mobile communication, each symbol may be used for downlink or uplink, as shown in an example of the following table. In the following table, uplink is indicated by U, and downlink is indicated by D. In the following table, X indicates a symbol that can be flexibly used for uplink or downlink.

TABLE 5

| Format | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | U | U | U | U | U | U | U | U | U | U | U | U |
| 38 | D | D | X | U | U | U | U | U | U | U | U | U | U | U |
| 39 | D | D | X | X | U | U | U | U | U | U | U | U | U | U |
| 40 | D | X | X | X | U | U | U | U | U | U | U | U | U | U |
| 41 | D | D | X | X | U | U | U | U | U | U | U | U | U | U |
| 42 | D | D | X | X | X | U | U | U | U | U | U | U | U | U |
| 43 | D | D | D | D | D | D | D | D | D | X | X | X | X | U |
| 44 | D | D | D | D | X | X | X | X | X | X | U | U | U | U |
| 45 | D | D | D | D | D | X | X | U | U | U | U | U | U | U |
| 46 | D | D | D | D | D | X | D | D | D | D | D | D | D | X |
| 47 | D | D | D | D | X | X | D | D | D | D | D | D | X | X |
| 48 | D | X | X | X | X | X | D | X | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | X | U | D | D | D | D | D | X | U | U | U |
| 55 | D | D | X | U | U | D | D | D | X | U | U | U | U | U |
| 56 | D | X | U | U | U | D | D | X | U | U | U | U | U | U |
| 57 | D | D | D | X | U | D | D | D | X | X | U | U | U | U |
| 58 | D | D | X | U | U | D | D | X | X | U | U | U | U | U |
| 59 | D | X | U | U | U | D | X | X | U | U | U | U | U | U |
| 60 | D | X | X | X | U | D | D | X | X | X | X | U | U | U |
| 61 | D | D | X | X | U | D | D | X | X | X | X | U | U | U |

Table 6 shows examples of operating bands on FR1. Operating bands shown in Table 6 is a reframing operating band that is transitioned from an operating band of LTE/LTE-A. This operating band may be referred to as FR1 operating band.

TABLE 6

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

Table 7 shows examples of operating bands on FR2. The following table shows operating bands defined on a high frequency. This operating band is referred to as FR2 operating band.

TABLE 7

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

In NR, E-UTRA (Evolved UMTS (Universal Mobile Telecommunications System) Terrestrial Radio Access) operating bands may also be used for communication. E-UTRA operating bands may mean operating bands of LTE.

The following table is an example of E-UTRA operating bands.

TABLE 8

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |

TABLE 8-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
|  | 5150 MHz-5925 MHz | 5150 MHz-5925 MHz | TDD |
| 46 | 5150 MHz-5925 MHz | 5150 MHz-5925 MHz | TDD |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD |
| 50 | 1432 MHz-1517 MHz | 1432 MHz-1517 MHz | TDD |
| 51 | 1427 MHz-1432 MHz | 1427 MHz-1432 MHz | TDD |
| 64 | Reserved | | |
| 65 | 1920 MHz-2010 MHz | 2110 MHz-2200 MHz | FDD |
| 66 | 1710 MHz-1780 MHz | 2110 MHz-2200 MHz | FDD |
| 67 | N/A | 738 MHz-758 MHz | FDD |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD |
| 76 | N/A | 1427 MHz-1432 MHz | FDD |
| 85 | 698 MHz-716 MHz | 728 MHz-746 MHz | FDD |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

Carrier aggregation may be classified into a continuous carrier aggregation in which aggregated carriers are continuous and a non-contiguous carrier aggregation in which aggregated carriers are separated from each other. In the following, carrier aggregation simply should be understood to include both the case where the component carrier (CC) is continuous and the case where it is discontinuous. The number of CCs aggregated between the downlink and the uplink may be set differently. A case in which the number of downlink CCs and the number of uplink CCs are the same may be referred to as symmetric aggregation, and a case in which the number of downlink CCs are different may be referred to as asymmetric aggregation.

On the other hand, carrier aggregation can also be classified into inter-band CA and intra-band CA. The inter-band CA is a method of aggregating and using each CC existing in different operating bands, and the intra-band CA is a method of aggregating and using each CC in the same operating band. In addition, the CA technology is more specifically, intra-band contiguous CA, intra-band non-contiguous CA and inter-band discontinuity. Non-Contiguous) CA.

Figure 9A:
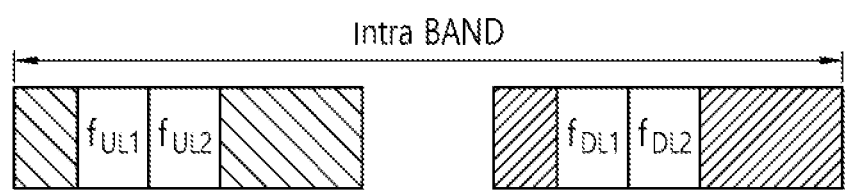
FIG. 9a illustrates a concept view of an example of intra-band contiguous CA.
Figure 9B:
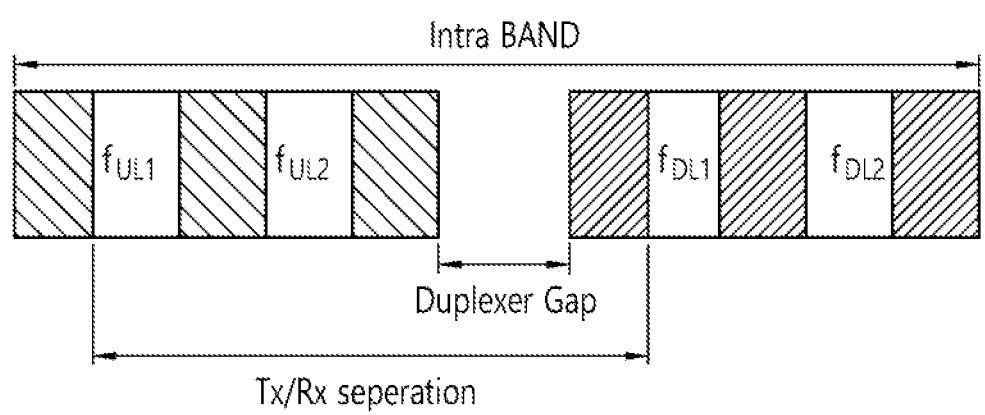
FIG. 9b illustrates a concept view of an example of intra-band non-contiguous CA.

FIG. 9a illustrates a concept view of an example of intra-band contiguous CA. FIG. 9b illustrates a concept view of an example of intra-band non-contiguous CA.

LTE-advanced adds various schemes including uplink MIMO and carrier aggregation in order to realize high-speed wireless transmission. The CA may be split into the intra-band contiguous CA shown in FIG. 8a and the intra-band non-contiguous CA shown in FIG. 9b.

Figure 10A:
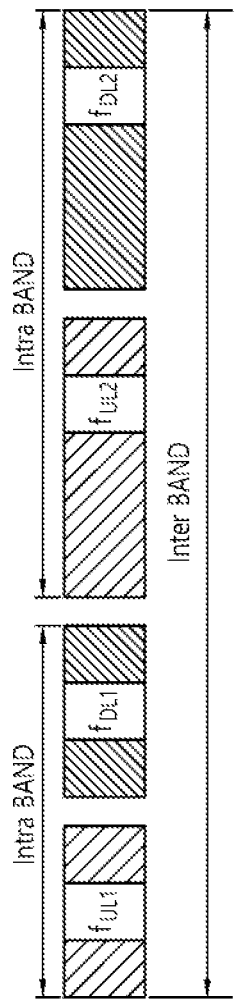
FIG. 10a illustrates a concept view of an example of a combination of a lower frequency band and a higher frequency band for inter-band CA.
Figure 10B:
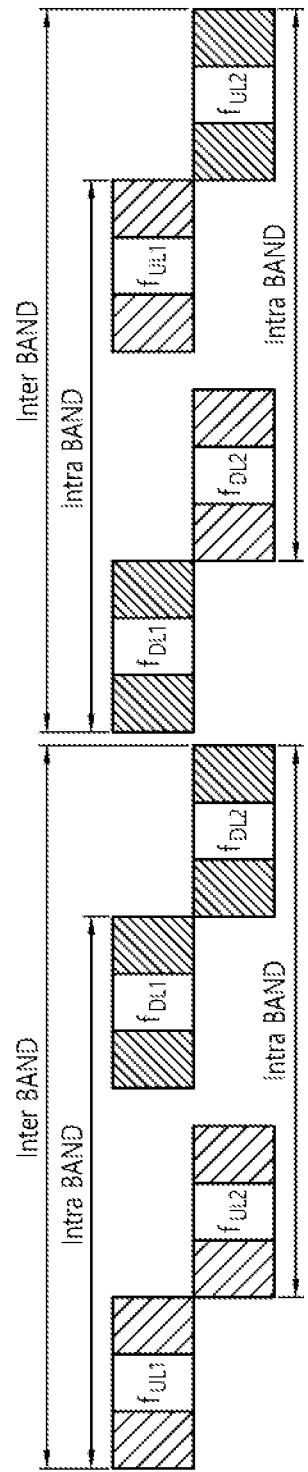
FIG. 10b illustrates a concept view of an example of a combination of similar frequency bands for inter-band CA.

FIG. 10a illustrates a concept view of an example of a combination of a lower frequency band and a higher frequency band for inter-band CA. FIG. 10b illustrates a concept view of an example of a combination of similar frequency bands for inter-band CA.

The inter-band carrier aggregation may be separated into inter-band CA between carriers of a low band and a high band having different RF characteristics of inter-band CA as shown in FIG. 10a and inter-band CA of similar frequencies that may use a common RF terminal per component carrier due to similar RF (radio frequency) characteristics as shown in FIG. 10b.

The following table is an example of Transmission bandwidth configuration NRB in E-UTRA.

TABLE 9

| Channel bandwidth BWChannel [MHz] | 1.4 | 3 | 5 | 10 | 15 | 20 |
|---|---|---|---|---|---|---|
| Transmission bandwidth configuration NRB | 6 | 15 | 25 | 50 | 75 | 100 |

In Table 9, NRB may mean Transmission bandwidth configuration, expressed in units of resource blocks. The following table is an example of CA bandwidth classes and corresponding nominal guard band BWGB.

TABLE 10

| CA Bandwidth Class | Aggregated Transmission Bandwidth Configuration | Number of contiguous CC | Nominal Guard Band BWGB |
|---|---|---|---|
| A | NRB, agg ≤ 100 | 1 | a1 BWChannel(1)-0.5 Δf1 (NOTE 2) |
| B | 25 < NRB, agg ≤ 100 | 2 | 0.05 max(BWChannel(1), BWChannel(2))-0.5 Δf1 |
| C | 100 < NRB, agg ≤ 200 | 2 | 0.05 max(BWChannel(1), BWChannel(2))-0.5 Δf1 |
| D | 200 < NRB, agg ≤ 300 | 3 | 0.05 max(BWChannel(1), BWChannel(2), BWChannel(3))-0.5 Δf1 |
| E | 300 < NRB, agg ≤ 400 | 4 | 0.05 max(BWChannel(1), BWChannel(2), BWChannel(3), BWChannel(4))-0.5 Δf1 |
| F | 400 < NRB, agg ≤ 500 | 5 | 0.05 max(BWChannel(1), BWChannel(2), BWChannel(3), BWChannel(4), BWChannel(5))-0.5 Δf1 |
| I | 700 < NRB, agg ≤ 800 | 8 | NOTE 3 |

NOTE 1:
BWChannel(j), j = 1, 2, 3, 4 is the channel bandwidth of an E-UTRA component carrier according to Table 9 and Δf1 = Δf for the downlink with Δf the subcarrier spacing while Δf1 = 0 for the uplink.
NOTE 2:
a1 = 0.16/1.4 for BWChannel(1) = 1.4 MHz whereas a1 = 0.05 for all other channel bandwidths.
NOTE 3:
Applicable for later releases.

In Table 10, BWGB may mean nominal guard band. The nominal guard band may mean a virtual guard band to facilitate transmitter (or receiver) filtering above/below edge CC (Component Carrier) s. NRB,agg may mean the number of aggregated RBs within a fully allocated Aggregated Channel bandwidth. The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 11:
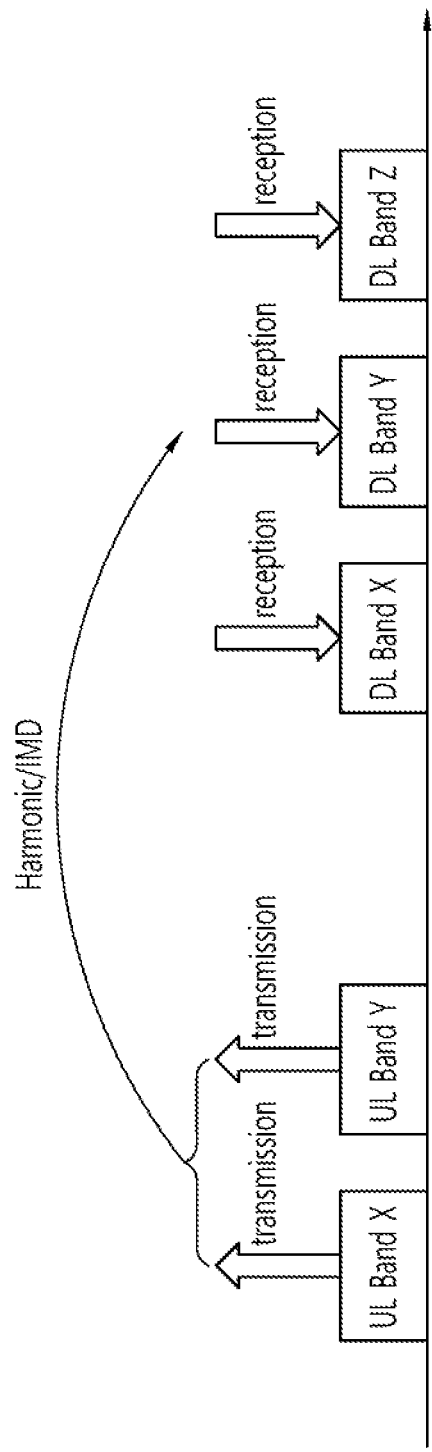
FIG. 11 illustrates an example of situation in which an uplink signal transmitted via an uplink operating band affects reception of a downlink signal on via downlink operating band.

FIG. 11 illustrates an example of situation in which an uplink signal transmitted via an uplink operating band affects reception of a downlink signal on via downlink operating band.

In FIG. 11, Intermodulation Distortion (IMD) may mean amplitude modulation of signals containing two or more different frequencies, caused by nonlinearities or time variance in a system. The intermodulation between frequency components will form additional components at frequencies that are not just at harmonic frequencies (integer multiples) of either, like harmonic distortion, but also at the sum and difference frequencies of the original frequencies and at sums and differences of multiples of those frequencies.

Referring to FIG. 11, an example in which a CA is configured with a terminal is shown. For example, the terminal may perform communication by using the CA based on three downlink operating bands (DL Band X, Y, Z) and two uplink operating bands (DL Band X, Y).

As shown in FIG. 11, in a situation in which three downlink operating bands are configured by the CA and two uplink operating bands are configured by the CA, the terminal may transmit an uplink signal through two uplink operating bands. In this case, a harmonics component and an intermodulation distortion (IMD) component occurring based on the frequency band of the uplink signal may fall into its own downlink band. That is, in the example of FIG. 11, when the terminal transmits the uplink signal, the harmonics component and the intermodulation distortion (IMD) component may occur, which may affect the downlink band of the terminal itself.

The terminal should be configured to satisfy a reference sensitivity power level (REFSENS) which is the minimum average power for each antenna port of the terminal when receiving the downlink signal.

When the harmonics component and/or IMD component occur as shown in the example of FIG. 11, there is a possibility that the REFSENS for the downlink signal may not be satisfied due to the uplink signal transmitted by the terminal itself.

For example, the REFSENS may be set such that the downlink signal throughput of the terminal is 95% or more of the maximum throughput of the reference measurement channel. When the harmonics component and/or IMD component occur, there is a possibility that the downlink signal throughput is reduced to 95% or less of the maximum throughput.

Therefore, when the harmonics component and/or IMD component occur, whether the harmonics component and the IMD component of the terminal occur may be determined, and the maximum sensitivity degradation (MSD) value is defined for the corresponding frequency band, so relaxation for REFSENS in the reception band related to its own transmission signal may be allowed. Here, the MSD may mean the maximum allowed reduction of the REFSENS. When the MSD is defined for a specific operating band of the terminal, which configured with the CA, the REFSENS of the corresponding operating band may be relaxed by the amount of the defined MSD.

Various combinations of downlink operating bands and uplink operating bands may be used for the CA. For example, for LTE-A inter-band CA, combinations of n (n=3, 4, 5) downlink operating bands and two uplink operating bands may be used.

Hereinafter, the LTE-A inter-band CA using combinations of n (n=3, 4, 5) downlink operating bands and two uplink operating bands may also be referred to as n bands (n=3, 4, 5) DL/2 bands UL, or n DL/2 UL inter-band CA.

Conventionally, the impact of harmonics and/or IMD on some combinations in the CA case based on n bands DL/2 bands UL combinations has not been analyzed and the MSD values have not been discussed. For example, the impact of the harmonics and/or IMD for a combination of a CA 2A-13A-66A-66B downlink band and a CA_13A-66A uplink band, and a combination of a CA_2A-48A-66A downlink band and a CA_48A-66A uplink band of Table 11, which will be described later, among 3 bands DL/2 band UL combinations is not analyzed, and the MSD values have not been discussed.

In the CA case based on n bands DL/2 bands UL combinations, the terminal may perform dual uplink transmission through two uplink operating bands. In this case, the MSD value for analyzing the impact of the harmonics and/or IMD occurring in the downlink operating band other than the uplink operating band used for the dual uplink transmission among the n downlink operating bands and relaxing the REFSENS specification needs to be proposed.

Hereinafter, the impact of the harmonics and/or IMD in the CA case based on the n bands DL/2 bands UL combinations is analyzed. In addition, the MSD value for relaxing the RESENS specification based on the analyzed results is proposed.

For example, self-interference (for example, interference due to the harmonics and/or IMD) occurring in the terminal, which configured with LTE-A inter-band CA (3 bands DL/2 bands UL), may be analyzed. In addition, the MSD value may be set based on the analyzed self-interference, and a reference sensitivity specification, which is relaxed due to the MSD, may be defined.

In other words, in the present disclosure, for the terminal, which configured with the 3 DL/2 Uplink LTE-A inter-band CA to perform communication, the impact of the self-interference (harmonics and/or IMD) occurring in another downlink band other than the uplink transmission bands may be analyzed. In addition, in the present disclosure, the maximum sensitivity degradation (MSD) value may be proposed in consideration of a radio frequency (RF) structure in a combination of bands in which the impact of self-interference is analyzed. The proposed MSD makes it possible to make exceptions to the reference sensitivity of the band (for example, to relax the REFSENS based on the MSD value). The reference sensitivity to which the exceptions are applied during the terminal test may be applied to the terminal, and the terminal may pass the terminal test based on the applied reference sensitivity As described above, for the combination of the UL operating band and the DL operating band having the self-interference problem, the MSD needs to be determined.

Among the 3 bands DL/2 bands UL combinations, for the 3 bands DL/2 bands UL combinations (that is, 3 bands DL/2 bands UL combination CA operating band combinations), the MSD for one downlink band (one of the three downlink bands) affected by the harmonic and/or IMD occurring during the dual uplink transmission based on two UL operating bands may be provided below.

For 4 bands DL/2 band UL CA band combinations and 5 bands DL/2 bands UL CA band combinations, no additional analysis is needed for harmonics and/or IMD in DL bands (4th and 5th bands) corresponding to the same E-UTRA operating band as the UL band. This is because all self-defense problems are addressed by a combination of the 2 bands DL/2 bands UL and the 3 bands DL/2 bands UL CA. For example, the 5 bands DL/2 bands UL CA combination includes a 3 bands DL/2 bands UL CA combination and a 2 bands DL/2 bands UL CA combination. Therefore, for the 5 bands DL/2 bands UL CA combination, the analysis results of the 3 bands DL/2 bands UL CA combination and the 2 bands DL/2 bands UL CA combination can be reused, and as a result, no additional analysis is needed for the/2 bands UL CA combination.

Table 11 below shows an example of the 3 bands DL/2 bands UL CA band combination associated with the self-interference problem.

TABLE 11

| Downlink CA configuration | Uplink CA configuration | Harmonic relation to 3rd band without uplink | Inter-modulation to 3rd band without uplink | Interference due to small frequency separation | MSD (Maximum Sensitivity Degradation) |
|---|---|---|---|---|---|
| CA_3A-11A-18A | CA_3A-11A | — | 5th IMD | — | 4.9 dB |
| CA_3A-11A-26A | CA_3A-11A | — | 5th IMD | — | 4.9 dB |
| CA_1A-3A-42C | CA_1A-42C | — | — | — | N/A |
| CA_1A-3A-42C | CA_3A-42C | — | — | — | N/A |
| CA_2A-4A-13A | CA_2A-13A | — | 4th IMD | — | 7.6 dB |
|  | CA_4A-13A | — | 4th IMD | — | 6.2 dB |
| CA_2A-2A-4A-5A | CA_2A-5A | — | 4th IMD | — | 7.6 dB |
|  | CA_4A-5A | — | 2nd IMD 5th IMD | — | 2nd and 5th IMD problems were already covered before. |
| CA_2A-2A-5A-66A-66A, CA_2A-5A-66A, CA_2A-5A-66B, CA_2A-5A-66C, CA_2A-5B-66A, CA_2A-5B-66B, CA_2A-5B-66C, CA_2A-2A-5A-66A, CA_2A-2A-5A-66B, CA_2A-2A-5A-66C, | CA_2A-5A CA_5A-66A | — | 4th IMD | — | 7.2 dB N/A |

TABLE 11-continued

| Downlink CA configuration | Uplink CA configuration | Harmonic relation to 3rd band without uplink | Inter-modulation to 3rd band without uplink | Interference due to small frequency separation | MSD (Maximum Sensitivity Degradation) |
|---|---|---|---|---|---|
| CA_2A-5A-66A-66A, CA_2A-5B-66A-66A | | | | | |
| CA_2A-5A-66A | CA_2A-66A | — | — | — | N/A |
| CA_2A-5A-66A-66A | CA_2A-66A | — | — | — | N/A |
| | CA_5A-66A | — | — | — | N/A |
| CA_2A-5A-48A | CA_2A-48A | — | — | — | N/A |
| | CA_5A-48A | — | 3rd IMD | — | Not difined |
| CA_2A-5A-48C | CA_2A-48A | — | — | — | N/A |
| CA_2A-5A-48D | CA_5A-48A | — | 3rd IMD | — | Not difined |
| | CA_2A-5A | 2nd harmonic at high frequency band edge | 3rd IMD | — | Not difined |
| CA_2A-5A-46D | CA_2A-5A | 3rd Harmonic | 4th IMD 5th IMD | — | No need to study for 3rd harmonic impact from B2 to B46 since B46 is specified as reference measurement exclusion region. No need to study for MSD since the requirements do not need to apply in exclusion zone. |
| CA_5A-46D-66A | CA_5A_46A | — | 5th IMD | — | 0.3 dB |
| | CA_5A_66A | 3rd Harmonic | 4th IMD 5th IMD | — | No need to study for 3rd harmonic impact from B66 to B46 since B46 is specified as reference measurement exclusion region. No need to study for MSD since the requirements do not need to apply in exclusion zone. |
| CA_2A-13A-66A-66B | CA_2A-13A | — | 4th IMD | — | 7.2 dB |
| CA_2A-13A-66A, CA_2A-2A-13A-66A, CA_2A-13A-66A-66A, CA_2A-13A-66B, CA_2A-13A-66C, *221 | CA_13A-66A | — | 4th IMD | — | 6.2 dB |
| CA_2A-13A-66A, CA_2A-13A-66A-66A | CA_2A-66A | — | — | — | N/A |

TABLE 11-continued

| Downlink CA configuration | Uplink CA configuration | Harmonic relation to 3rd band without uplink | Intermodulation to 3rd band without uplink | Interference due to small frequency separation | MSD (Maximum Sensitivity Degradation) |
|---|---|---|---|---|---|
| CA_2A-13A-48A | CA_2A-48A | — | — | — | N/A |
| | CA_13A-48A | — | 3rd IMD | — | Not difined |
| CA_2A-13A-48A-48C | CA_2A-13A | 2nd Harmonic at high frequency band edge | | | 2nd harmonic impact from B2 to B48 was covered before. |
| CA_13A-46D-66A | CA_13A-66A | 3rd Harmonic | 4th IMD 5th IMD | — | No need to study for 3rd harmonic impact from B66 to B46 since B46 is specified as reference measurement exclusion region. No need to study for MSD since the requirements do not need to apply in exclusion zone. |
| CA_2A-13A-46DCA_2A-13A-46A-46D CA_2A-13A-46A-46C | CA_2A-13A | 3rd Harmonic | 4th IMD | — | No need to study for 3rd harmonic impact from B2 to B46 since B46 is specified as reference measurement exclusion region. |
| CA_2A-13A-46C CA_2A-13A-46A-46A CA_2A-13A-46A CA_2A-13A-46E | | | | | No need to study for MSD since the requirements do not need to apply in exclusion zone. |
| CA_1A-3A-38A | CA_1A-3A | — | — | Yes | Close proximity issue was already covered before. |
| CA_2A-12A-66A | CA_2A-12A | 3rd Harmonic impact from B12 to B66 | | | 3rd harmonic impact from B12 to B66 was covered before. |
| | CA_2A-66A | — | — | — | N/A |
| | CA_12A-66A | 3rd Harmonic impact from B12 to B66 | Side lobe impact of 4th IMD | — | — 3rd harmonic impact from B12 to B66 was covered before. 0 dB |
| CA_1A-3A-42D | CA_1A-3A | 2nd Harmonic impact from B3 to B42 | 4th IMD | Yes | Close proximity issue was already covered before. 2nd harmonic impact from B3 to B42 was covered before. 4th IMD problem was already covered before. |
| | CA_1A-42A | — | — | — | N/A |
| | CA_3A-42A | — | — | — | N/A |
| | CA_1A-42C | — | — | — | N/A |
| | CA_3A-42C | — | — | — | N/A |

TABLE 11-continued

| Downlink CA configuration | Uplink CA configuration | Harmonic relation to 3rd band without uplink | Inter-modulation to 3rd band without uplink | Interference due to small frequency separation | MSD (Maximum Sensitivity Degradation) |
|---|---|---|---|---|---|
| CA_2A-46E-48A, CA_2A-46D-48A CA_2A-46D-48C CA_2A-46C-48C CA_2A-46D-48A CA_2A-46A-48C CA_2A-46C-48A CA_2A-46A-48A | CA_2A-48A | 3rd  Harmonic | 2nd IMD  3rd IMD | — | No need to study for 3rd harmonic impact from B2 to B46 since B46 is specified as reference measurement exclusion region. No need to study for MSD since the requirements do not need to apply in exclusion zone. |
| CA_2A-48A-66A | CA_2A-48A | — | 4th IMD | — | 12.1 dB |
| CA_2A-48A-66A-66A, CA_2A-48D-66A, CA_2A-48C-66A-66A, CA_2A-48D-66A-66A, CA_2A-48E-66A, CA_2A-48E-66A-66A | CA_48A-66A | — | 2nd IMD 5th IMD | — | 28.3 dB for IMD2 0 dB for IMD5 |
| CA_2A-48A-66A, CA_2A-48A-66A-66A, CA_2A-48D-66A CA_2A-48C-66A-66A, CA_2A-48D-66A-66A, CA_2A-48E-66A, CA_2A-48E-66A-66A | CA_2A-66A | 2nd Harmonics | 2nd IMD | — | Not defined |
| CA_3A-8A-38A | CA_3A-8A | — | 2nd IMD 3rd IMD | — | 26.4 dB for IMD2 15.7 dB for IMD3 |
| CA_1A-1A-3C-5A | CA_1A-3A | — | — | Yes | Close proximity issue was already covered before. |
|  | CA_1A-5A | — | — | — | N/A |
|  | CA_3A-5A | — | — | — | N/A |
| CA_1A-1A-3C-28A | CA_1A-3A |  | — | Yes | Close proximity issue was already covered before. |
|  | CA_1A-28A | — | 5th IMD | — | 4 dB for IMD5 |
|  | CA_3A-28A | 3rd Harmonic | 4th IMD | — | 3rd harmonic impact from B28 to B1 was covered before. 11 dB for IMD5 |
| CA_1A-3A-3A-7A, CA_1A-3A-3A-7A-7A | CA_1A-3A | — | — | Yes | Close proximity issue was already covered before. |
|  | CA_1A-7A | — | — | — | N/A |
|  | CA_3A-7A | — | — | — | N/A |
| CA_2A-14A-30A | CA_2A-14A | — | — | — | N/A |
|  | CA_14A-30A | — | — | — | N/A |

TABLE 11-continued

| Downlink CA configuration | Uplink CA configuration | Harmonic relation to 3rd band without uplink | Intermodulation to 3rd band without uplink | Interference due to small frequency separation | MSD (Maximum Sensitivity Degradation) |
|---|---|---|---|---|---|
| CA_2A-14A-66A | CA_2A-14A | — | 4th IMD | — | Not difined |
| CA_2A-2A-14A-66A CA_2A-14A-66A-66A CA_2A-2A-14A-66A-66A CA_2A-14A-66A-66A-66A | CA_14A-66A | — | 4th IMD | — | Not difined |
| CA_14A-30A-66A | CA_14A-30A | — | — | — | N/A |
| CA_14A-30A-66A-66A | CA_14A-66A | — | — | — | N/A |
| CA_2A-46E-66A CA_2A-46D-66A CA_2A-46C-66A CA_2A-46A-66A | CA_2A-66A | 3rd harmonic | 3rd IMD 5th IMD | — | No need to study for 3rd harmonic impact from B2 to B46 since B46 is specified as reference measurement exclusion region. |
| CA_13A-48A-66A | CA_13A-48A | — | 3rd IMD | — | 17.1 dB |
| CA_13A-48A-66A-66A | CA_13A-66A | 2nd harmonic | 5th IMD | — | 2nd harmonic impact from B66 to B48 was covered before. 0 dB (no impact from 5th IMD) |
| CA_13A-48C-66A | CA_48A-66A | — | — | — | N/A |
| CA_46D-48C-66A CA_46C-48C-66A CA_46A-48C-66A CA_46D-48A-66A CA_46C-48A-66A CA_46A-48A-66A | CA_48A-66A | 3rd harmonic | 2nd IMD 3rd IMD | — | No need to study for 3rd harmonic impact since B46 is specified as reference measurement exclusion region. No need to study for MSD since the requirements do not need to apply in exclusion zone. |
| CA_1A-7A-20A | CA_1A-7A | — | 5th IMD | — | MSD is proposed to be 0 dB as the similar CA combination CA_1A-5A-7A has a very small MSD requirement (i.e., 1 dB) which should not be specified. |
| | CA_1A-20A | — | — | — | N/A |
| | CA_7A-20A | — | — | — | N/A |
| CA_1A-3A-3A-8A | CA_1A-3A | — | — | Yes | Close proximity issue was already covered before. |
| | CA_1A-8A | — | — | — | N/A |
| | CA_3A-8A | — | — | — | N/A |
| CA_1A-7A-8A CA_1A-7A-7A-8A | CA_7A-8A | — | — | — | N/A |
| CA_1A-7A-7A-8A | CA_1A-7A | — | — | — | N/A |
| | CA_1A-8A | 3rd harmonic | — | — | 3rd harmonic impact from B8 to B7 was covered before. |

TABLE 11-continued

| Downlink CA configuration | Uplink CA configuration | Harmonic relation to 3rd band without uplink | Intermodulation to 3rd band without uplink | Interference due to small frequency separation | MSD (Maximum Sensitivity Degradation) |
|---|---|---|---|---|---|
| CA_2A-13A-48C | CA_2A-48A | — | — | — | N/A |
| | CA_13A-48A | — | 3rd IMD | — | Not defined |
| | CA_2A-13A | 2nd harmonic at high frequency band edge | — | — | 2nd harmonic impact from B2 to B48 was covered before. |
| CA_2A-13A-48D | CA_13A-48A | — | 3rd IMD | — | Not defined |
| | CA_2A-48A | — | — | — | N/A |
| CA_13A-48C-66A-66A, CA_13A-48D-66A-66A | CA_48A-66A | — | — | — | N/A |
| | CA_13A-48A | — | 3rd IMD | — | 3rd IMD problem was already covered before. |
| | CA_13A-66A | 2nd harmonic | 5th IMD | — | 2nd harmonic impact from B66 to B48 was covered before. No MSD is needed. |
| CA_13A-48D-66A | CA_48A-66A | — | — | — | N/A |
| | CA_13A-48A | — | 3rd IMD | — | 3rd IMD problem was already covered before. |
| CA_5A-48A-66A, CA_5A-48C-66A, CA_5A-48A-66A-66A, CA_5A-48D-66A-66A, | CA_48A-66A | — | — | — | N/A |
| | CA_5A-66A | 2nd harmonic | 5th IMD | — | 2nd harmonic impact from B66 to B48 was covered before Not defined for IMD |
| CA_5A-48C-66A-66A, CA_5A-48D-66A | CA_5A-48A | — | — | — | N/A |
| | CA_48A-66A | — | — | — | N/A |
| | CA_5A-48A | — | — | — | N/A |

In Table 11, 3rd band without uplink means a downlink operating band that does not overlap two uplink operating bands among three downlink operating bands used for the CA.

For example, in the CA_2A-5A-48C-48D downlink band and CA_2A-5A uplink band combination, the 3rd band without uplink means downlink operating band 2.

Here, the CA 2A-5A-48C-48D downlink band may mean that downlink operating bands 2, 5 and 48 are used, and the CA_2A-5A uplink band may mean that uplink operating bands 2 and 5 are used.

Alphabets (A, B, C, D, and the like) after the number refer to a bandwidth class described in the example of Table 10. For example, the CA_2A-5A-48C-48D downlink band means that CC with bandwidth class C and/or D in downlink operating band 48, CC with bandwidth class A and CC with bandwidth class B are used in the downlink operating band 2, and the CC with the bandwidth class A is used in the downlink operating band 2, and the CC with the bandwidth class A is used in the downlink operating band 5.

Referring to Table 11, the self-interference problem of the combination of the CA 2A-5A-48C-48D downlink band and the CA_2A-5A uplink band, and the combination of the CA_2A-5A-48C-48D downlink band and the CA_5A-48A uplink band, and the combination of the CA 2A-5A-48A downlink band and the CA 5A-48A uplink band, and the combination of the CA 2A-13A-48A downlink band and the CA_13A-48A uplink band, and the combination of the CA 2A-48A-66A downlink band and the CA_2A-66A uplink band, and the combination of the CA 2A-48A-66A-66A downlink band and the CA_2A-66A uplink band, and the combination of the CA 2A-48D-66A downlink band and the CA_2A-66A uplink band, and the combination of the CA 2A-48C-66A-66A downlink band and the CA_2A-66A uplink band, and the combination of the CA 2A-48D-66A-66A downlink band and the CA_2A-66A uplink band, and the combination of the CA 2A-48E-66A downlink band and the CA_2A-66A uplink band, and the combination of the CA 2A-48E-66A-66A downlink band and the CA 2A-66A uplink band, and the combination of the CA 2A-14A-66A downlink band and the CA_2A-14A uplink band, and the combination of the CA 2A-14A-66A downlink band and the CA_14A-66A uplink band, and the combination of the CA 2A-2A-14A-66A downlink band and the CA_2A-14A uplink band, and the combination of the CA 2A-2A-14A-66A downlink band and the CA_14A-66A uplink band, and the combination of the CA 2A-14A-66A-66A downlink band and the CA_2A-14A uplink band, and the combination of the CA 2A-14A-66A-66A downlink band and the CA_14A-66A uplink band, and the combination of the CA 2A-2A-14A-66A-66A downlink band and the CA_2A-14A uplink band, and the combination of the CA 2A-2A-14A-66A-66A downlink band and the CA_14A-66A uplink band, and the combination of the CA 2A-14A-66A-66A-66A downlink band and the CA 2A-14A uplink band, and the combination of the CA 2A-14A-66A-66A-66A downlink band and the CA_14A-66A uplink band, and the combination of the CA 2A-13A-48A downlink band and the CA_13A-48A uplink band, and the combination of the CA 2A-13A-48D downlink band and the CA_13A-48A uplink band, and the combination of the CA 5A-48A-66A downlink band and the CA_5A-66A uplink band, and the combination of the CA 5A-48C-66A downlink band and the CA 5A-66A uplink band, and the combination of the CA_5A-48A-66A-66A downlink band and the CA_5A-66A uplink band, and the combination of the CA 5A-48C-66A-66A downlink band and the CA_5A-66A uplink band are not defined.

Hereinafter, the 3rh IMD for the downlink operating band 2 will be analyzed for the combination of the CA 2A-5A-48A downlink band and the CA_5A-48A uplink band, and the combination of the CA_2A-13A-48A downlink band and the CA_13A-48A uplink band. Based on the analysis results, the MSD values for the combination of the CA 2A-5A-48A downlink band and the CA_5A-48A uplink band, and the combination of the CA 2A-13A-48A downlink band and the CA_13A-48A uplink band will be determined. The 3rh IMD for the downlink operating band 48 will be analyzed for the combination of the CA 2A-5A-48A downlink band and the CA 2A-5A uplink band will be determined. The 2nd IMD for the downlink operating band 48 will be analyzed for the combination of the CA 2A-48A-66A downlink band and the CA_2A-66A uplink band will be determined.

Figure 12:
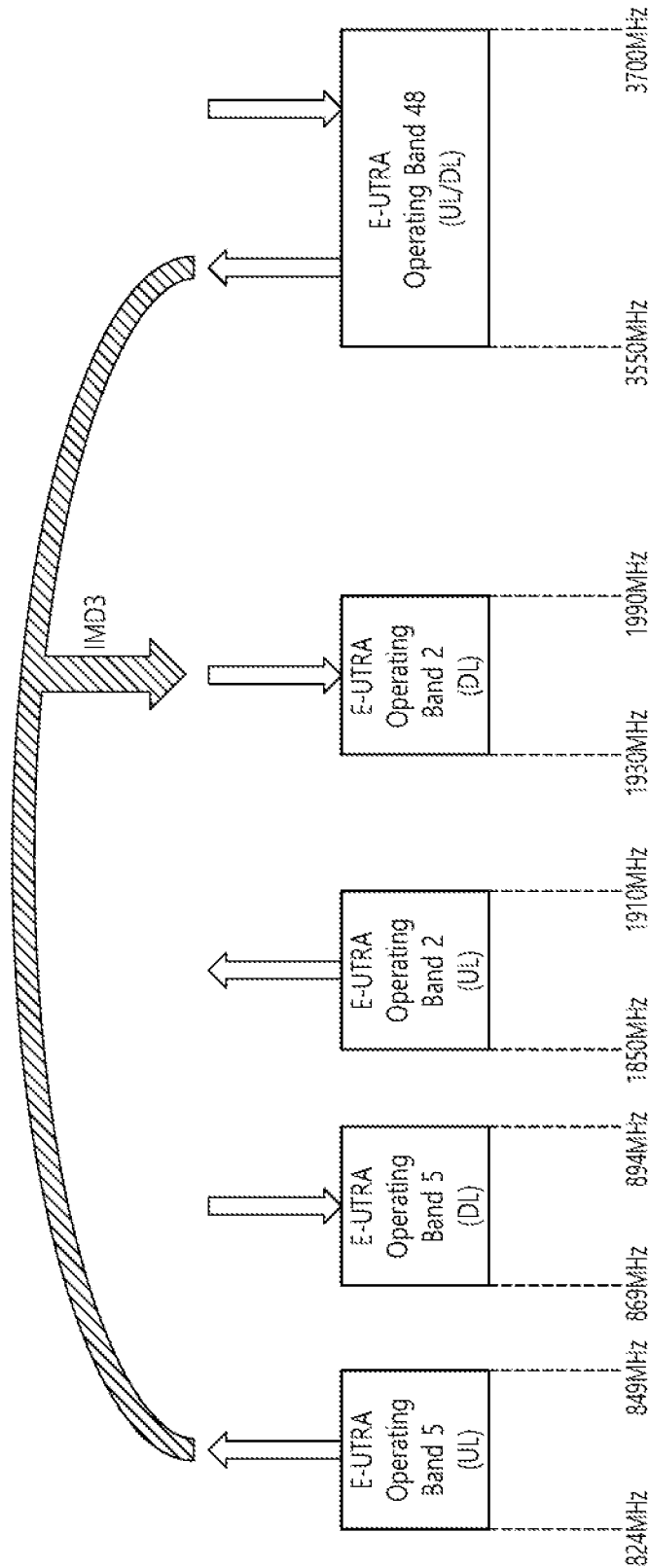
FIG. 12 illustrates an example of IMD 3 for CA with downlink bands 2, 5, 48 and uplink bands 5, 48.

FIG. 12 illustrates an example of IMD 3 for CA with downlink bands 2, 5, 48 and uplink bands 5, 48.

FIG. 12 shows an example of the IMD 3 affecting the downlink band 2 in the combination of the CA_2A-5A-48A downlink band and CA_5A-486A uplink band.

Referring to FIG. 11, a 3rd order IMD (IMD 3) component of an uplink signal transmitted in the uplink band 5 and an uplink signal transmitted in the uplink band 48 may fall into a frequency range of the downlink band 2.

The worst case where the impact of the IMD 3 within the frequency range of the downlink band 2 is greatest is the case where a center frequency of the uplink band 5 is 839 MHz, a center frequency of the uplink operating band 48 is 3640 MHz, and a center frequency of the downlink operating band 2 is 1962 MHz. In this case, since 3640*1−839*2=1962, the frequency of the IMD3 component of the uplink bands 5 and 48 coincides with the center frequency of the downlink band 2.

Figure 13:
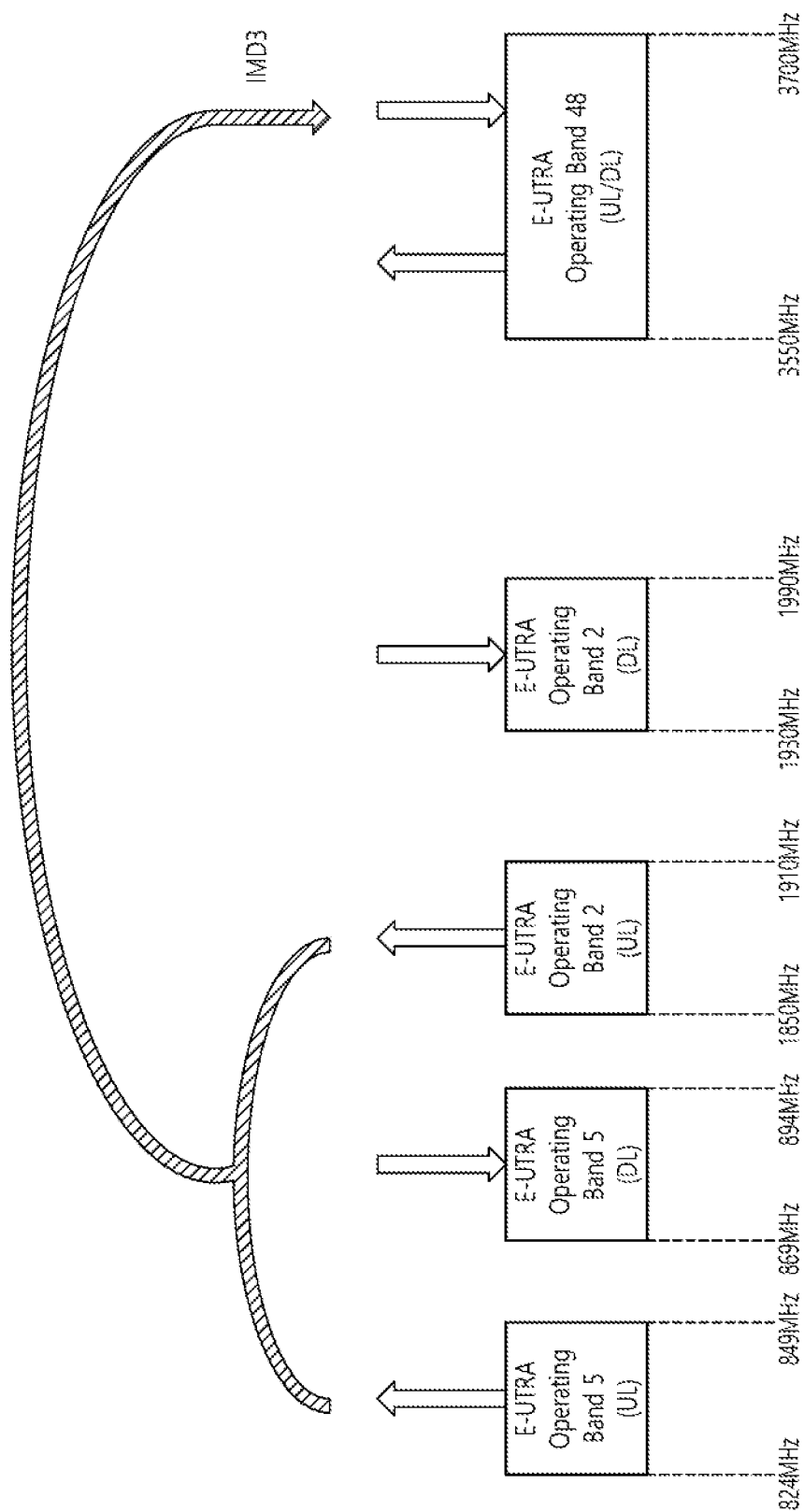
FIG. 13 illustrates an example of IMD 3 for CA with downlink bands 2, 5, 48 and uplink bands 2, 5.

FIG. 13 illustrates an example of IMD 3 for CA with downlink bands 2, 5, 48 and uplink bands 2, 5.

FIG. 13 shows an example of the IMD 3 affecting the downlink band 2 in the combination of the CA_2A-5A-48A downlink band and the CA_2A-5A uplink band.

Referring to FIG. 13, a 3rd order IMD (IMD 3) component of an uplink signal transmitted in the uplink band 2 and an uplink signal transmitted in the uplink band 5 may fall into a frequency range of the downlink band 48.

The worst case where the impact of the IMD 3 within the frequency range of the downlink band 48 is greatest is the case where a center frequency of the uplink band 2 is 1905 MHz, a center frequency of the uplink operating band 5 is 844 MHz, and a center frequency of the downlink operating band 48 is 3593 MHz. In this case, since 1905*1+844*2=3593, the frequency of the IMD3 component of the uplink bands 2 and 5 coincides with the center frequency of the downlink band 48.

Figure 14:
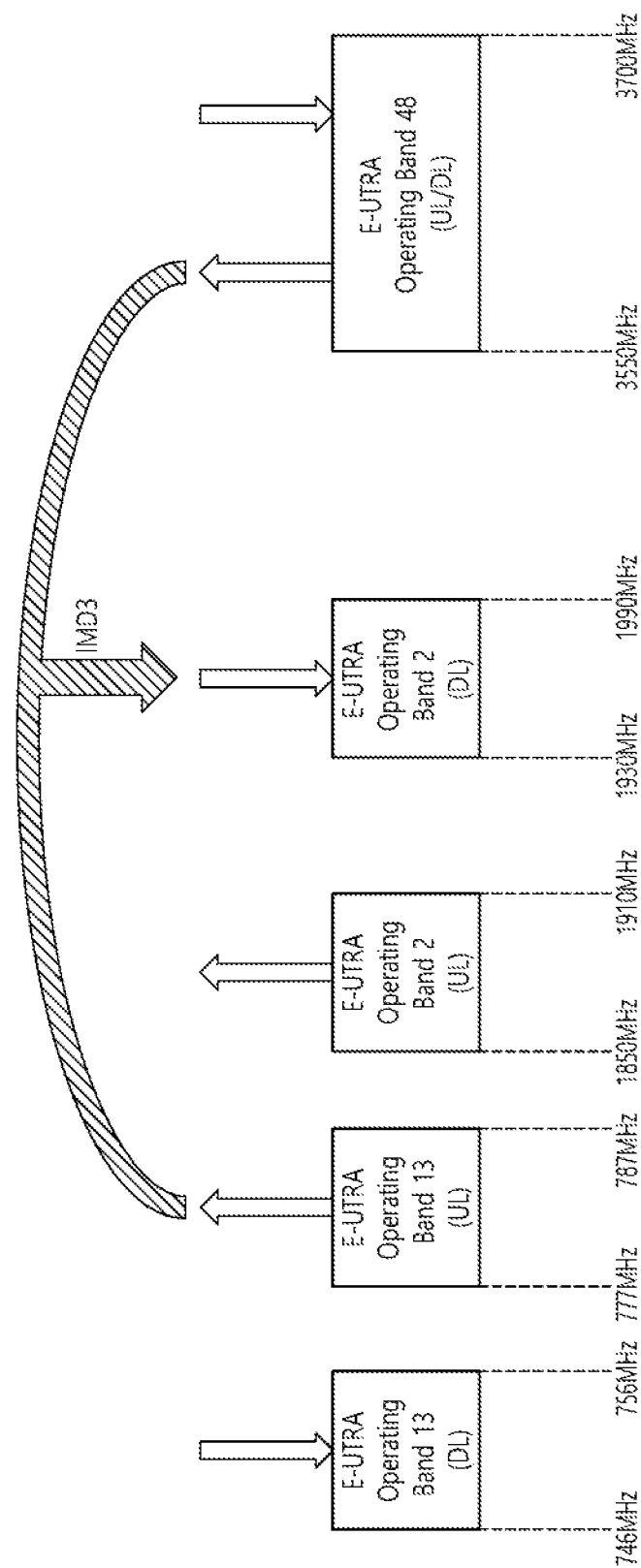
FIG. 14 illustrates an example of IMD 3 for CA with downlink bands 2, 13, 48 and uplink bands 13, 48.

FIG. 14 illustrates an example of IMD 3 for CA with downlink bands 2, 13, 48 and uplink bands 13, 48.

FIG. 14 shows an example of the IMD 3 affecting the downlink band 2 in the combination of the CA 2A-13A-48A downlink band and the CA_13A-48A uplink band.

Referring to FIG. 14, a 3rd order IMD (IMD 3) component of an uplink signal transmitted in the uplink band 13 and an uplink signal transmitted in the uplink band 48 may fall into a frequency range of the downlink band 2.

The worst case where the impact of the IMD 3 within the frequency range of the downlink band 2 is greatest is the case where a center frequency of the uplink band 13 is 784.5 MHz, a center frequency of the uplink operating band 48 is 3552.5 MHz, and a center frequency of the downlink operating band 2 is 1983.5 MHz. In this case, since 3552.5*1−784.5*2=1983.5, the frequency of the IMD3 component of the uplink bands 2 and 5 coincides with the center frequency of the downlink band 2.

Figure 15:
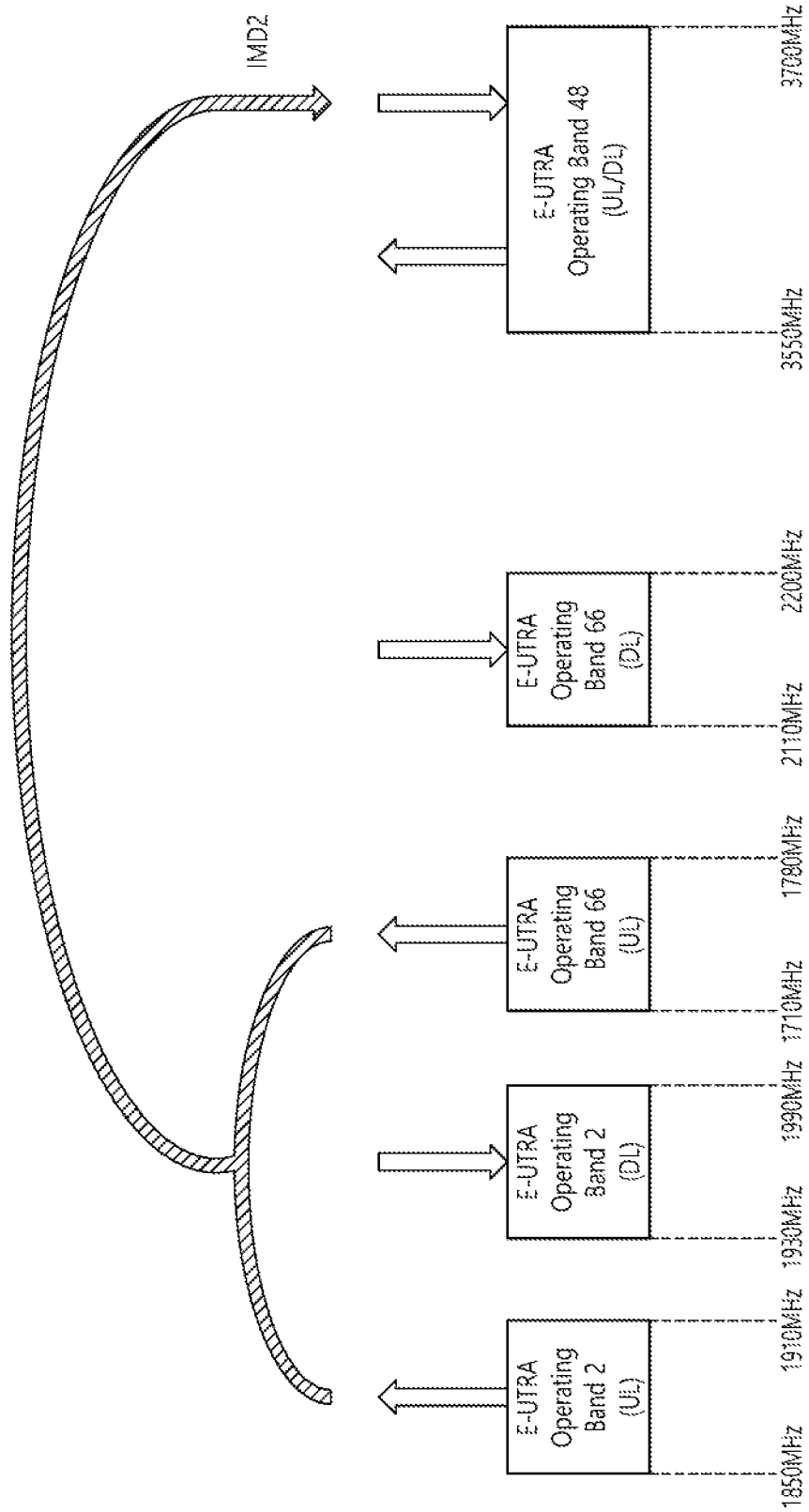
FIG. 15 illustrates an example of IMD 2 for CA with downlink bands 2, 48, 66 and uplink bands 2, 66.

FIG. 15 illustrates an example of IMD 2 for CA with downlink bands 2, 48, 66 and uplink bands 2, 66.

FIG. 15 shows an example of the IMD 2 affecting the downlink band 48 in the combination of the CA 2A-48A-66A downlink band and the CA_48A-66A uplink band.

Referring to FIG. 15, a 2nd order IMD (IMD 2) component of an uplink signal transmitted in the uplink band 2 and an uplink signal transmitted in the uplink band 66 may fall into a frequency range of the downlink band 48.

The worst case where the impact of the IMD 2 within the frequency range of the downlink band 48 is greatest is the case where a center frequency of the uplink band 2 is 1855 MHz, a center frequency of the uplink operating band 66 is 1770 MHZ, and a center frequency of the downlink operating band 48 is 3625 MHz. In this case, since 1770*1+1855*1=3625, the frequency of the IMD2 component of the uplink bands 2 and 48 coincides with the center frequency of the downlink band 66.

Table 12 shows an example of RF component parameters of the UE used to analyze the IMD and determine the MSD value.

TABLE 12

| UE ref. architecture | Cascaded Diplexer & Triplexer Architectures All CA band combos | | | |
| --- | --- | --- | --- | --- |
| Component | IP2 (dBm) | IP3 (dBm) | IP4 (dBm) | IP5 (dBm) |
| Ant. Switch | 112 | 68 | 55 | 55 |
| Triplexer | 110 | 72 | 55 | 52 |
| Diplexer | 115 | 87 | 55 | 55 |
| Duplexer | 100 | 75 | 55 | 53 |
| Quadplexer | 110 | 72 | 55 | 52 |
| PA Forward | 28.0 | 32 | 30 | 28 |
| PA Reversed | 40 | 30.5 | 30 | 30 |
| LNA | 10 | 0 | 0 | −10 |

Here, IP n may mean an nth order intercept point. For example, IP4 is a 4th order intercept point. LNA may mean a low noise amplifier. PA may mean a power amplifier. By using simulation based on UE reference architecture and the RF component parameters in Table 12, the IMD problem and MSD are analyzed in the above combinations of bands.

Table 13 shows an example of an isolation level of the RF component of the UE used to analyze the IMD and determine the MSD value.

TABLE 13

| Isolation Parameter | Value (dB) | Comment |
| --- | --- | --- |
| Antenna to Antenna | 10 | Main antenna to diversity antenna |
| PA (out) to PA (in) | 60 | PCB isolation (PA forward mixing) |
| Triplexer | 20 | High/low band isolation |
| Diplexer | 25 | High/low band isolation |
| Quadplexer | 15 | Adjacent Tx-Rx atten level |
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

Table 13 shows an example of isolation parameters of UE RF front-end component parameters. Based on simulation based on the isolation parameters in Table 13, the IMD problem and MSD are analyzed in the above combinations of bands. Based on simulation based on the isolation parameters in Table 13 and UE reference architecture and the RF component parameters in Table 12, the IMD problem and MSD are analyzed in the above combinations of bands.

Figure 16:
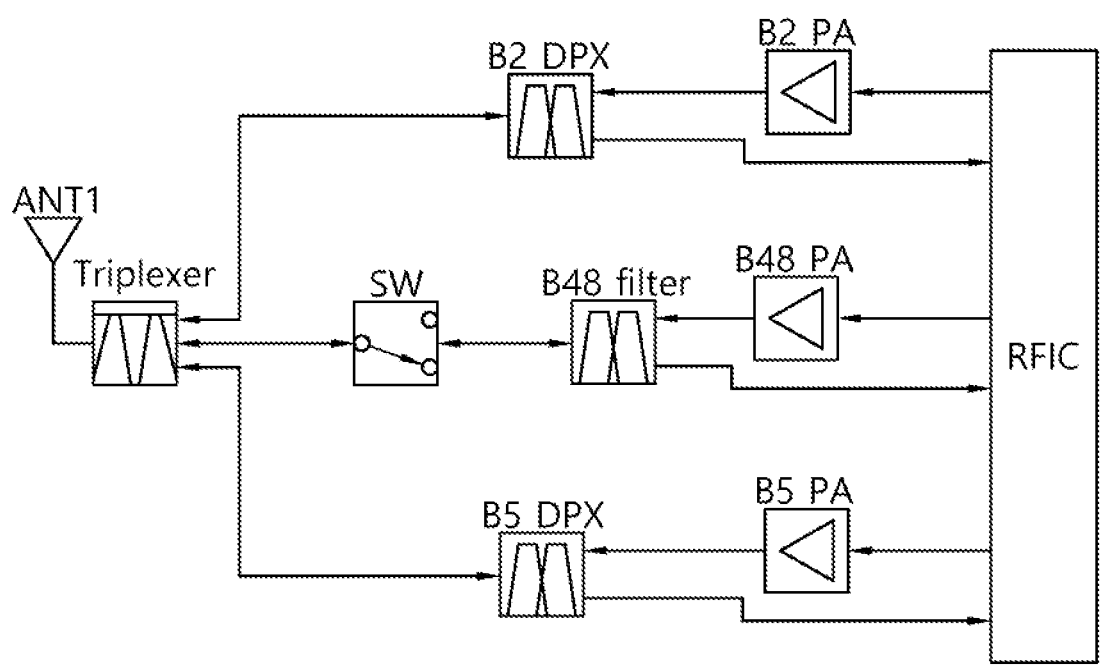
FIG. 16 illustrates an example of terminal's RF structure used for analyzing IMD and MSD for CA with downlink bands 2, 5, 48 with uplink bands 5, 48 and downlink bands 2, 5, 48 with uplink bands 2, 5.
Figure 17:
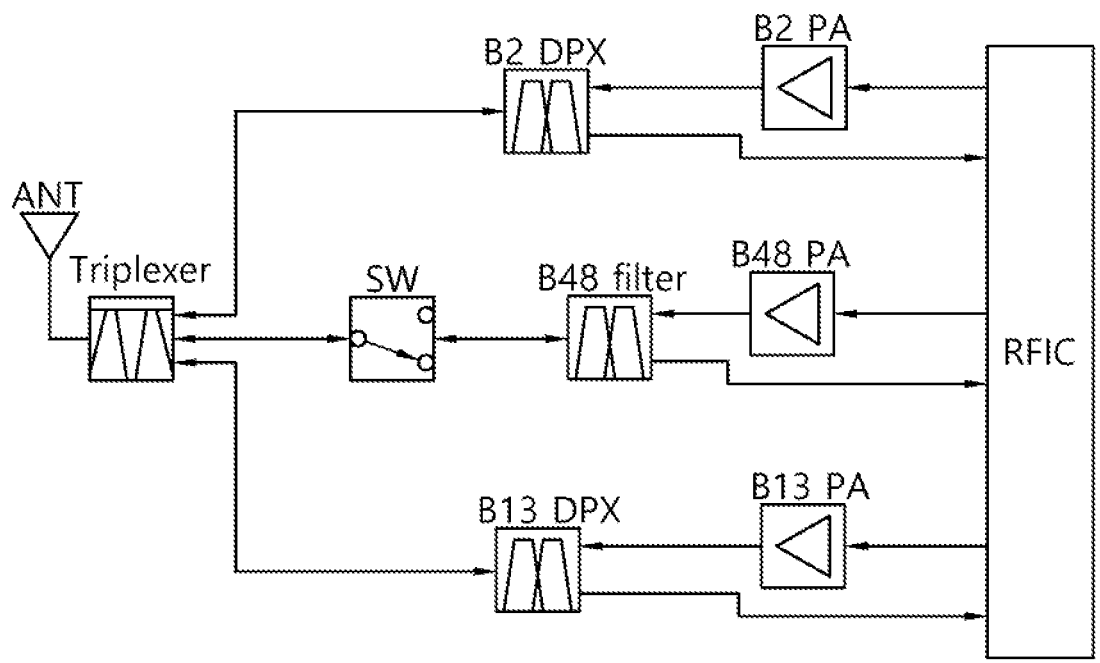
FIG. 17 illustrates an example of terminal's RF structure used for analyzing IMD and MSD for CA with downlink bands 2, 13, 48 and uplink bands 13, 48.
Figure 18:
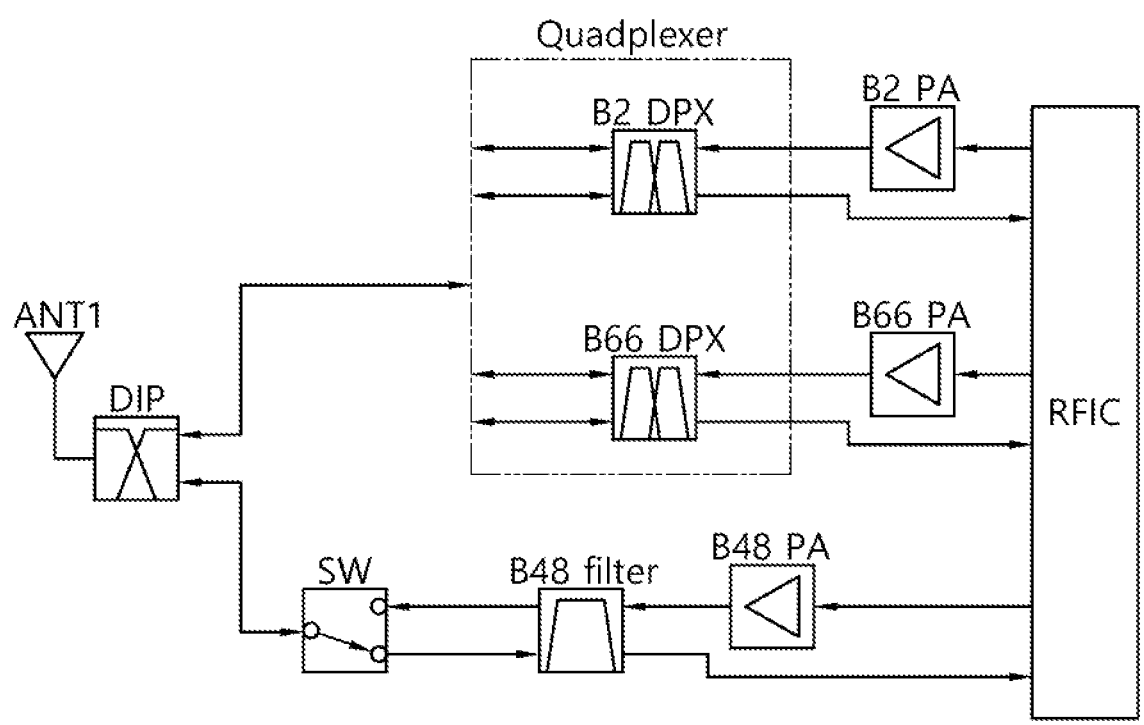
FIG. 18 illustrates an example of terminal's RF structure used for analyzing IMD and MSD for CA with downlink bands 2, 48, 66 and uplink bands 2, 66.

Hereinafter, FIGS. 16, 17 and 18 are examples of an RF structure of a terminal based on components to which parameters of Table 16 and Table 17 are applied. Based on the RF structure according to the example of FIG. 16, the IMD and the MSD of the combination of the CA 2A-5A-48A downlink band and the CA_5A-48A uplink band may be analyzed. Based on the RF structure according to the example of FIG. 16, the IMD and the MSD of the combination of the CA 2A-5A-48A downlink band and the CA_2A-5A uplink band may be analyzed. Based on the RF structure according to the example of FIG. 17, the IMD and the MSD of the combination of the CA 2A-13A-48A downlink band and the CA_13A-48A uplink band may be analyzed. Based on the RF structure according to the example of FIG. 17, the IMD and the MSD of the combination of the CA 2A-48A-66A downlink band and the CA_2A-66A uplink band may be analyzed.

For reference, in FIGS. 16, 17 and 18, the B48 filter, the same parameters as the duplexers of Table 12 and Table 13 are applied. In addition, RFIC may refer to a radio-frequency integrated circuit. And DPX may mean a duplexer. DIP may mean a diplexer, PA may mean a power amplifier.

Examples of the RF structure illustrated in FIGS. 16, 17 and 18 may be implemented by being included in a transceiver of a terminal. For example, the terminal may be a first wireless device 100 of FIG. 2. The transceiver(s) 106 of the first wireless device 100 may include the RF structure according to the examples of FIGS. 16, 17 and 18.

FIG. 16 illustrates an example of terminal's RF structure used for analyzing IMD and MSD for CA with downlink bands 2, 5, 48 with uplink bands 5, 48 and downlink bands 2, 5, 48 with uplink bands 2, 5.

When the uplink CA_5A_48A (bands 5 and 48) is paired with the downlink CA 2A-5A-48A (bands 2, 5 and 48), the 3th order IMD component occurring by the uplink band 5 and the uplink band 48 may affect an Rx frequency band 2 (that is, downlink band 2) of the terminal itself. That is, 3rd the order IMD may fall into downlink band 2.

Based on the example of the RF structure shown in FIG. 16, the 3rd order IMD component affecting the downlink band 2 is analyzed, and the MSD value determined based on the analyzed IMD is 15.6 dB of Table 14 below.

When the uplink CA_2A_5A (bands 2 and 5) is paired with the downlink CA 2A-5A-48A (bands 2, 5 and 48), the 3th order IMD component occurring by the uplink band 2 and the uplink band 5 may affect an Rx frequency band 48 (that is, downlink band 48) of the terminal itself. That is, 3rd the order IMD may fall into downlink band 48.

Based on the example of the RF structure shown in FIG. 16, the 3rd order IMD component affecting the downlink band 48 is analyzed, and the MSD value determined based on the analyzed IMD is 16.6 dB of Table 14 below.

FIG. 17 illustrates an example of terminal's RF structure used for analyzing IMD and MSD for CA with downlink bands 2, 13, 48 and uplink bands 13, 48.

When the uplink CA_13A_48A (bands 13 and 48) is paired with the downlink CA 2A-13A-48A (bands 2, 13 and 48), the 3rd order IMD component occurring by the uplink band 13 and the uplink band 48 may affect the Rx frequency band 2 (that is, downlink band 2) of the terminal itself. That is, the 3rd order IMD may fall into the downlink band 2.

Based on the example of the RF structure shown in FIG. 17, the 3rd order IMD components affecting the downlink band 2 is analyzed, and the MSD value determined based on the analyzed IMD is 15.6 dB of Table 14 below.

FIG. 18 illustrates an example of terminal's RF structure used for analyzing IMD and MSD for CA with downlink bands 2, 48, 66 and uplink bands 2, 66.

When the uplink CA_2A_66A (bands 2 and 66) is paired with the downlink CA_2A-48A-66A (bands 2, 48 and 66), the 3rd order IMD component occurring by the uplink band 2 and the uplink band 66 may affect the Rx frequency band 48 (that is, downlink band 48) of the terminal itself. That is, the 3rd order IMD may fall into the downlink band 48.

Based on the example of the RF structure shown in FIG. 18, the 3rd order IMD components affecting the downlink band 48 is analyzed, and the MSD value determined based on the analyzed IMD is 32 dB of Table 14 below.

As described above, based on the simulation based on Tables 12, 13, and FIGS. 16, 17 and 18, the IMD problem and MSD for the downlink operating band 2 are analyzed in the combination of the CA_2A-5A-48A downlink band and the CA 5A-48A uplink band, and the combination of the CA 2A-13A-48A downlink band and the CA_13A-48A uplink band. As described above, based on the simulation based on Tables 12, 13, and FIGS. 16, 17 and 18, the IMD problem and MSD for the downlink operating band 48 are analyzed in the combination of the CA 2A-5A-48A downlink band and the CA_2A-5A uplink band, and the combination of the CA 2A-48A-66A downlink band and the CA_2A-66A uplink band.

The IMD and MSD analyses are performed according to the simulations performed, and the MSD values determined according to the analysis results are shown in Table 14.

TABLE 14

E-UTRA Band/Channel bandwidth/NRB/Duplex mode

| EUTRA CA DL Configuration | EUTRA CA UL Configuration | EUTRA band | UL Fc (MHz) | UL BW (MHz) | UL CL RB | DL Fc (MHz) | DL BW (MHz) | MSD (dB) | Duplex mode | Source of IMD |
|---|---|---|---|---|---|---|---|---|---|---|
| CA_2A-5A-48A | CA_5A-48A | 2 | 1882 | 5 | 25 | 1962 | 5 | 15.6 ± α | FDD- | IMD3 |
| CA_2A-5A-48C | | 5 | 839 | 5 | 25 | 884 | 5 | N/A | TDD | |
| CA_2A-5A-48D | | 48 | 3640 | 5 | 25 | 3640 | 5 | N/A | | |
| CA_2A-5A-48C | CA_2A-5A | 2 | 1905 | 5 | 25 | 1985 | 5 | N/A | FDD- | IMD3 |
| CA_2A-5A-48D | | 5 | 844 | 5 | 25 | 889 | 5 | N/A | TDD | |
| | | 48 | 3593 | 5 | 25 | 3593 | 5 | 16.6 ± α | | |
| CA_2A-13A-48A | CA_13A-48A | 2 | 1903.5 | 5 | 25 | 1983.5 | 5 | 15.6 ± α | FDD- | IMD3 |
| CA_2A-13A-48C | | 13 | 784.5 | 5 | 25 | 753.5 | 5 | N/A | TDD | |
| CA_2A-13A-48D | | 48 | 3552.5 | 5 | 25 | 3552.5 | 5 | N/A | | |
| CA_2A-48A-66A, | CA_2A-66A | 2 | 1855 | 5 | 25 | 1935 | 5 | N/A | FDD- | IMD2 |
| CA_2A-48D-66A, | | 48 | 3625 | 5 | 25 | 3625 | 5 | 32.0 ± α | TDD | |
| CA_2A-48E-66A, | | 66 | 1770 | 5 | 25 | 2190 | 5 | N/A | | |
| CA_2A-48A-66A-66A, | | | | | | | | | | |
| CA_2A-48C-66A-66A, | | | | | | | | | | |
| CA_2A-48D-66A-66A, | | | | | | | | | | |
| CA_2A-48E-66A-66A | | | | | | | | | | |
| CA_5A-48A-66A, | CA_5A-66A | 5 | 829 | 5 | 25 | 874 | 5 | N/A | FDD- | IMD5 |
| CA_5A-48C-66A, | | 48 | 3622 | 5 | 25 | 3622 | 5 | 0 | TDD | |
| CA_5A-48A-66A-66A, | | 66 | 1760 | 5 | 25 | 2180 | 5 | N/A | | |
| CA_5A-48D-66A-66A, | | | | | | | | | | |
| CA_5A-48C-66A-66A | | | | | | | | | | |

Table 14 shows the MSD values applicable to the downlink operation band 2 in the combination of the CA 2A-5A-48A downlink band and the CA_5A-48A uplink band, and the combination of the CA_2A-13A-48A downlink band and the CA 13A-48A uplink band. Table 14 shows the MSD values applicable to the downlink operating band 48 in the combination of the CA 2A-5A-48A downlink band and the CA_2A-5A uplink band, and the combination of the CA 2A-48A-66A downlink band and the CA_2A-66A uplink band.

In Table 14, Fc means a center frequency. For example, UL Fc may mean the center frequency of the uplink operating band or the center frequency of the CC in the uplink operating band. CLRB may mean Transmission bandwidth which represents the length of a contiguous resource block allocation expressed in units of resource blocks.

When the terminal receives the downlink signal through the downlink operation band 2 in the combination of the CA 2A-5A-48A downlink band and the CA 5A-48A uplink band, and the combination of the CA 2A-13A-48A downlink band and the CA_13A-48A uplink band, the MSD values in Table 14 can be applied to the reference sensitivity for the downlink operating band 2. When the terminal receives the downlink signal through the downlink operation band 48 in the combination of the CA 2A-5A-48A downlink band and the CA_2A-5A uplink band, and the combination of the CA_2A-48A-66A downlink band and the CA_2A-66A uplink band, the MSD values in Table 14 can be applied to the reference sensitivity for the downlink operating band 48.

For example, the MSD values in Table 14 may be applied to minimum requirements that the terminal, which is configured with the CA based on the combination of the CA 2A-5A-48A downlink band and the CA_5A-48A uplink band, should satisfy. That is, the MSD may be applied to the reference sensitivity of the downlink operating band 2. In other words, the reference sensitivity of the downlink operating band 2 may be relaxed by 15.6 dB.

Potential IMD problems can occur in the combination of the CA_2A-5A-48A downlink band and the CA_5A-48A uplink band, and the combination of the CA 2A-13A-48A downlink band and the CA_13A-48A uplink band, and therefore, it is suggested to apply the MSD values in Table 14 to the reference sensitivity of the downlink operating band 2. Potential IMD problems can occur in the combination of the CA 2A-5A-48A downlink band and the CA_2A-5A uplink band, and the combination of the CA 2A-48A-66A downlink band and the CA_2A-66A uplink band, and therefore, it is suggested to apply the MSD values in Table 14 to the reference sensitivity of the downlink operating band 48.

The reception performance of the terminal can be tested by applying the MSD values in Table 14 to the reference sensitivity of the downlink operating band 2 and 48. In other words, the MSD values in Table 14 may be applied to the reference sensitivity of the downlink operating band 2 and 48 used when the reception performance of the terminal is tested. The transceiver (or receiver) of the terminal that passed the test satisfies the minimum requirements based on the reference sensitivity to which the MSD values in Table 14 apply.

The terminal (for example, first device 100 of FIG. 2) may include at least one transceiver (for example, transceiver(s) 106 of FIG. 2), at least one processor (for example, processor(s) 102 of FIG. 2). The terminal may also include at least one memory (for example, memory(s) 104 of FIG. 2. The transceiver may be configured to use a plurality of E-UTRA operating bands. For example, the CA may be configured such that the transceiver uses E-UTRA operating bands 2, 5 and 48 as a downlink band (for example, CA_2A-5A-48B downlink band) and uses E-UTRA operating bands 5 and 48 as an uplink band (for example, CA_5A-48A uplink band). At least one processor may be operably connectable to the transceiver. A processor may control the transceiver. At least one memory is operably connectable to at least one processor and at least one transceiver. The at least one memory may store instructions that may be executed by at least one processor. The at least one processor may execute instructions stored in at least one memory. The operations performed by the processor may be performed by executing instructions stored in the memory. At least one processor may control at least one transceiver to transmit an uplink signal through at least two (for example, bands 5 and 48) of the plurality of E-UTRA operating bands. At least one processor may control at least one transceiver to receive a downlink signal through at least three (for example, bands 2, 5 and 48) of the plurality of E-UTRA operating bands. The combination of the at least two bands and the at least three bands may be a combination set for the CA. That is, the terminal may perform communication using the CA based on the combination of the at least two downlink operating bands and the at least three downlink operating bands. As in the example of Table 14, a preset MSD value may be applied to the reference sensitivity for the E-UTRA operating band 2 and 48.

Figure 19:
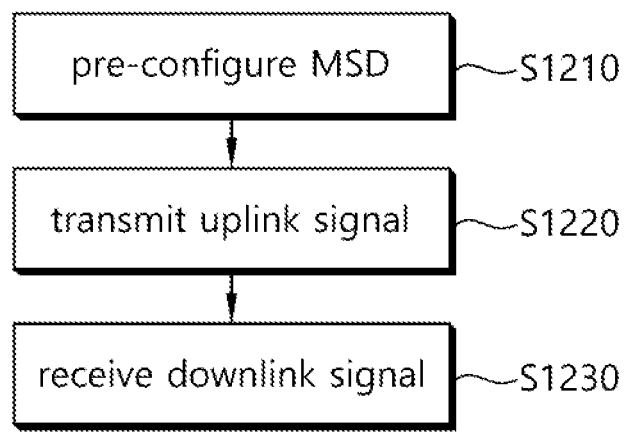
FIG. 19 is a flow chart showing an example of a procedure of a terminal according to the present disclosure.

Hereinafter, FIG. 19 illustrates an example of an operation performed by the terminal.

FIG. 19 is a flow chart showing an example of a procedure of a terminal according to the present disclosure.

Referring to FIG. 19, steps S1210 to S1230 are shown. Operations described below may be performed by the terminal (for example, the first device 100 of FIG. 2).

For reference, step S1210 may not always be performed when the terminal performs communication. For example, step S1210 may be performed only when the reception performance of the terminal is tested.

In the terminal performing the operation of FIG. 19, the CA based on the combination of three downlink bands and the two uplink bands may be configured. For example, the combination of three downlink bands and two uplink bands may be the combination of the CA 2A-5A-48A downlink band and the CA_5A-48A uplink band.

In step S1210, the terminal may preset the MSD value. For example, the terminal may preset the MSD values in Table 14. For example, for the combination of the CA 2A-5A-48A downlink band and the CA_5A-48A uplink band, an MSD of 15.6 dB may be applied to the reference sensitivity of the downlink band 2.

In step S1220, the terminal may transmit the uplink signal.

When the combination of the CA_2A-5A-48A downlink band and the CA_5A-48A uplink band is configured in the terminal, the terminal may transmit the uplink signal through at least one of the uplink operating bands 135 and/or 48.

When the combination of the CA 2A-5A-48A downlink band and the CA_5A-48A uplink band is configured in the terminal, the terminal may transmit the uplink signal through at least one of the uplink operating bands 5 and/or 48.

In step S1230, the terminal may receive the downlink signal.

The terminal may receive the downlink signal based on the reference sensitivity of the downlink band 2, to which the MSD value is applied.

When the combination of the CA 2A-5A-48A downlink band and the CA 5A-48A uplink band is configured in the terminal, the terminal may receive the downlink signal through at least one of the downlink operating bands 2, 5 and/or 48.

For reference, the order in which steps S1220 and S1230 are performed may be different from that shown in FIG. 19. For example, step S1230 may be performed first and then step S1220 may be performed. Alternatively, step S1220 and step S1230 may be performed simultaneously. Alternatively, the time when step S1220 and step S1230 may be may overlap partially.

CA configurations under study in LTE-A inter-band CA: Band 2 and Band 13 and Band 48 DL with 2 bands UL are as Table 15

TABLE 15

| E-UTRA CA configuration/Bandwidth combination set | | | | | | | | | | |
|---|---|---|---|---|---|---|---|---|---|---|
| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
| CA_2A-13A-48A-48C | CA_2A-13A | 2 | | | Yes | Yes | Yes | Yes | 90 | 0 |
| | | 13 | | | Yes | Yes | | | | |
| | | 48 | | | Yes | Yes | Yes | Yes | | |
| | | 48 | | | See CA_48C Bandwidth combination set 0 in Table 5.6A.1-1 | | | | | |
| CA_2A-13A-48A | CA_13A-48A | 2 | Yes | Yes | Yes | Yes | Yes | Yes | 50 | 0 |
| | | 13 | | | Yes | Yes | | | | |
| | | 18 | | | Yes | Yes | Yes | Yes | | |
| CA_2A-13A-48C | CA_13A-48A | 2 | Yes | Yes | Yes | Yes | Yes | Yes | 70 | 0 |
| | | 13 | | | Yes | Yes | | | | |
| | | 48 | | | See CA_48C Bandwidth combination set 0 in Table 5.6A.1-1 | | | | | |
| CA_2A-13A-48D | CA_13A-48A | 2 | Yes | Yes | Yes | Yes | Yes | Yes | 90 | 0 |
| | | 13 | | | Yes | Yes | | | | |
| | | 48 | | | See CA_48D Bandwidth combination set 0 in Table 5.6A.1-1 | | | | | |

For 3 bands DL with 2 bands UL, receiver desensitization study 2nd and 3rd order harmonics and 2nd, 3rd, 4th and 5th order intermodulation products were analyzed in Table 16. Co-existence study for UL CA_2A-13A and DL CA_2A-13A-48A-48C is as Table 16.

TABLE 16

| UE UL carriers | fx_low | fx_high | fy_low | fy_high |
|---|---|---|---|---|
| UL frequency (MHz) | 1850 | 1910 | 777 | 787 |
| 2nd harmonics frequency limits | 2 * fx_low | 2 * fx_high | 2 * fy_low | 2 * fy_high |
| 2nd harmonics frequency limits (MHz) | 3700 | 3820 | 1554 | 1574 |
| 3rd harmonics frequency limits | 3 * fx_low | 3 * fx_high | 3 * fy_low | 3 * fy_high |
| 3rd harmonics frequency limits (MHz) | 5550 | 5730 | 2331 | 2361 |
| Two tone 2nd order IMD products IMD frequency limit (MHz) | \|fy_low − fx_high\| 1133 | \|fy_high − fx_low\| 1063 | \|fy_low + fx_low\| 2627 | \|fy_high + fx_high\| 2697 |
| Two-tone 3rd order IMD products IMD frequency limit (MHz) | \|2 * fx_low − fy_high\| 2913 | \|2 * fx_high − fy_low\| 3043 | \|2 * fy_low − fx_high\| 356 | \|2 * fy_high − fx_low\| 276 |
| Two-tone 3rd order IMD products IMD frequency limit (MHz) | \|2 * fx_low + fy_low\| 4477 | \|2 * fx_high + fy_high\| 4607 | \|2 * fy_low + fx_low\| 3404 | \|2 * fy_high + fx_high\| 3484 |
| Two-tone 4th order IMD products IMD frequency limit (MHz) | \|3 * fx_low − fy_high\| 4763 | \|3 * fx_high − fy_low\| 4953 | \|3 * fy_low − fx_high\| 421 | \|3 * fy_high − fx_low\| 511 |
| Two-tone 4th order IMD products IMD frequency limit (MHz) | \|3 * fx_low + fy_low\| 6327 | \|3 * fx_high + fy_high\| 6517 | \|3 * fy_low + fx_low\| 4181 | \|3 * fy_high + fx_high\| 4271 |
| Two-tone 4th order IMD products IMD frequency limit (MHz) | \|2 * fx_low − 2 * fy_high\| 2126 | \|2 * fx_high − 2 * fy_low\| 2266 | \|2 * fx_low + 2 * fy_low\| 5254 | \|2 * fx_high + 2 * fy_high\| 5394 |
| Two-tone 5th order IMD products IMD frequency limit (MHz) | \|fx_low − 4 * fy_high\| 1298 | \|fx_high − 4 * fy_low\| 1198 | \|fy_low − 4 * fx_high\| 6863 | \|fy_high − 4 * fx_low\| 6613 |
| Two-tone 5th order IMD products IMD frequency limit (MHz) | \|fx_low + 4 * fy_low\| 4958 | \|fx_high + 4 * fy_high\| 5058 | \|fy_low + 4 * fx_low\| 8177 | \|fy_high + 4 * fx_high\| 8427 |
| Two-tone 5th order IMD products IMD frequency limit (MHz) | \|2 * fx_low − 3 * fy_high\| 1339 | \|2 * fx_high − 3 * fy_low\| 1489 | \|2 * fy_low − 3 * fx_high\| 4176 | \|2 * fy_high − 3 * fx_low\| 3976 |
| Two-tone 5th order IMD products IMD frequency limit (MHz) | \|2 * fx_low + 3 * fy_low\| 6031 | \|2 * fx_high + 3 * fy_high\| 6181 | \|2 * fy_low + 3 * fx_low\| 7104 | \|2 * fy_high + 3 * fx_high\| 7304 |

For 3 bands DL with 2 bands UL, own receiver desensitization study 2nd and 3rd order harmonics and 2nd, 3rd, 4th and 5th order intermodulation products were analyzed in Table 17. Co-existence study for UL CA band 13 and band 48 and DL CA band 2 and band 13 and band 48 is as Table 17.

TABLE 17

| UE UL carriers | fx_low | fx_high | fy_low | fy_high |
|---|---|---|---|---|
| UL frequency (MHz) | 777 | 787 | 3550 | 3700 |
| 2nd harmonics frequency limits | 2 * fx_low | 2 * fx_high | 2 * fy_low | 2 * fy_high |
| 2nd harmonics frequency limits (MHz) | 1554 | 1574 | 7100 | 7400 |

TABLE 17-continued

| UE UL carriers | fx_low | fx_high | fy_low | fy_high |
|---|---|---|---|---|
| 3rd harmonics frequency limits | 3 * fx_low | 3 * fx_high | 3 * fy_low | 3 * fy_high |
| 3rd harmonics frequency limits (MHz) | 2331 | 2361 | 10650 | 11100 |
| Two tone 2nd order IMD products IMD frequency limit (MHz) | \|fy_low − fx_high\| 2763 | \|fy_high − fx_low\| 2923 | \|fy_low + fx_low\| 4327 | \|fy_high + fx_high\| 4487 |
| Two-tone 3rd order IMD products IMD frequency limit (MHz) | \|2 * fx_low − fy_high\| 2146 | \|2 * fx_high − fy_low\| 1976 | \|2 * fy_low − fx_high\| 6313 | \|2 * fy_high − fx_low\| 6623 |
| Two-tone 3rd order IMD products IMD frequency limit (MHz) | \|2 * fx_low + fy_low\| 5104 | \|2 * fx_high + fy_high\| 5274 | \|2 * fy_low + fx_low\| 7877 | \|2 * fy_high + fx_high\| 8187 |
| Two-tone 4th order IMD products IMD frequency limit (MHz) | \|3 * fx_low − fy_high\| 1369 | \|3 * fx_high − fy_low\| 1189 | \|3 * fy_low − fx_high\| 9863 | \|3 * fy_high − fx_low\| 10323 |
| Two-tone 4th order IMD products IMD frequency limit (MHz) | \|3 * fx_low + fy_low\| 5881 | \|3 * fx_high + fy_high\| 6061 | \|3 * fy_low + fx_low\| 11427 | \|3 * fy_high + fx_high\| 11887 |
| Two-tone 4th order IMD products IMD frequency limit (MHz) | \|2 * fx_low − 2 * fy_high\| 5846 | \|2 * fx_high − 2 * fy_low\| 5526 | \|2 * fx_low + 2 * fy_low\| 8654 | \|2 * fx_high + 2 * fy_high\| 8974 |
| Two-tone 5th order IMD products IMD frequency limit (MHz) | \|fx_low − 4 * fy_high\| 14023 | \|fx_high − 4 * fy_low\| 13413 | \|fy_low − 4 * fx_high\| 402 | \|fy_high − 4 * fx_low\| 592 |
| Two-tone 5th order IMD products IMD frequency limit (MHz) | \|fx_low + 4 * fy_low\| 14977 | fx_high + 4 * fy_high\| 15587 | fy_low + 4 * fx_low\| 6658 | fy_high + 4 * fx_high\| 6848 |
| Two-tone 5th order IMD products IMD frequency limit (MHz) | \|2 * fx_low − 3 * fy_high\| 9546 | \|2 * fx_high − 3 * fy_low\| 9076 | \|2 * fy_low − 3 * fx_high\| 4739 | \|2 * fy_high − 3 * fx_low\| 5069 |
| Two-tone 5th order IMD products IMD frequency limit (MHz) | \|2 * fx_low + 3 * fy_low\| 12204 | \|2 * fx_high + 3 * fy_high\| 12674 | 2 * fy_low + 3 * fx_low\| 9431 | \|2 * fy_high + 3 * fx_high\| 9761 |

CA configurations under study in LTE-A inter-band CA: Band 2 and Band 48 and Band 66 DL with 2 bands UL are as Table 18.

TABLE 18

E-UTRA CA configuration/Bandwidth combination set

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_2A-48A-66A | CA_2A-48A | 2 | Yes | Yes | Yes | Yes | Yes | Yes | 60 | 0 |
|  | CA_48A-66A | 48 |  |  | Yes | Yes | Yes | Yes |  |  |
|  | CA_2A-66A | 66 | Yes | Yes | Yes | Yes | Yes | Yes |  |  |
| CA_2A-48C-66A | CA_2A-48A | 2 | Yes | Yes | Yes | Yes | Yes | Yes | 80 | 0 |
|  | CA_48A-66A | 48 |  | See CA_48C Bandwidth Combination set 0 in Table 5.6A.1-1 |  |  |  |  |  |  |
|  |  | 66 | Yes | Yes | Yes | Yes | Yes | Yes |  |  |
| CA_2A-48D-66A | CA_2A-66A | 2 | Yes | Yes | Yes | Yes | Yes | Yes | 100 | 0 |
|  |  | 48 |  | See CA_48D Bandwidth combination set 0 in Table 5.6A.1-1 |  |  |  |  |  |  |
|  |  | 66 | Yes | Yes | Yes | Yes | Yes | Yes |  |  |

TABLE 18-continued

E-UTRA CA configuration/Bandwidth combination set

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_2A-48E-664 | CA_2A-66A | 2 | Yes | Yes | Yes | Yes | Yes | Yes | 100 | 0 |
|  |  | 48 |  | See CA_48E Bandwidth combination set 0 in Table 5.6A.1-1 |  |  |  |  |  |  |
|  |  | 66 | Yes | Yes | Yes | Yes | Yes | Yes |  |  |
| CA_2A-48A-66A-66A | CA_2A-66A | 2 | Yes | Yes | Yes | Yes | Yes | Yes | 80 | 0 |
|  |  | 48 |  |  | Yes | Yes | Yes | Yes |  |  |
|  |  | 66 | See CA_66A-66A Bandwidth Combination Set 0 in Table 5.6A.1-3 |  |  |  |  |  |  |  |
| CA_2A-48C-66A-66A | CA_2A-66A | 2 | Yes | Yes | Yes | Yes | Yes | Yes | 100 | 0 |
|  |  | 48 |  | See CA_48C Bandwidth combination set 0 in Table 5.6A.1-1 |  |  |  |  |  |  |
|  |  | 66 | See CA_66A-66A Bandwidth Combination Set 0 in Table 5.6A.1-3 |  |  |  |  |  |  |  |
| CA_2A-48D-66A-66A | CA_2A-66A | 2 | Yes | Yes | Yes | Yes | Yes | Yes | 120 | 0 |
|  |  | 48 |  | See CA_48D Bandwidth combination set 0 in Table 5.6A.1-1 |  |  |  |  |  |  |
|  |  | 66 | See CA_66A-66A Bandwidth Combination Set 0 in Table 5.6A.1-3 |  |  |  |  |  |  |  |
| CA_2A-48E-66A-66A | CA_2A-66A | 2 | Yes | Yes | Yes | Yes | Yes | Yes | 120 | 0 |
|  |  | 48 |  | See CA_48E Bandwidth combination set 0 in Table 5.6A.1-1 |  |  |  |  |  |  |
|  |  | 66 | See CA_66A-66A Bandwidth Combination Set 0 in Table 5.6A.1-3 |  |  |  |  |  |  |  |

For 3 bands DL with 2 bands UL, own receiver desensitization study 2nd and 3rd order harmonics and 2nd, 3rd, 4th and 5th order intermodulation products were analyzed in Table 19. Co-existence study for UL CA band 48 and band 66 and DL CA band 2 and band 48 and band 66 is as Table 19.

TABLE 19

| UE UL carriers | fx_low | fx_high | fy_low | fy_high |
|---|---|---|---|---|
| UL frequency (MHz) | 1710 | 1780 | 3550 | 3700 |
| 2nd harmonics frequency limits | 2 * fx_low | 2 * fx_high | 2 * fy_low | 2 * fy_high |
| 2nd harmonics frequency limits (MHz) | 3420 | 3560 | 7100 | 7400 |
| 3rd harmonics frequency limits | 3 * fx_low | 3 * fx_high | 3 * fy_low | 3 * fy_high |
| 3rd harmonics frequency limits (MHz) | 5130 | 5340 | 10650 | 11100 |
| Two tone 2nd order IMD products | \|fy_low − fx_high\| | \|fy_high − fx_low\| | \|fy_low + fx_low\| | \|fy_high + fx_high\| |
| IMD frequency limit (MHz) | 1770 | 1990 | 5260 | 5480 |
| Two-tone 3rd order IMD products | \|2 * fx_low − fy_high\| | \|2 * fx_high − fy_low\| | \|2 * fy_low − fx_high\| | \|2 * fy_high − fx_low\| |
| IMD frequency limit (MHz) | 280 | 10 | 5320 | 5690 |
| Two-tone 3rd order IMD products | \|2 * fx_low + fy_low\| | \|2 * fx_high + fy_high\| | \|2 * fy_low + fx_low\| | \|2 * fy_high + fx_high\| |
| IMD frequency limit (MHz) | 6970 | 7260 | 8810 | 9180 |
| Two-tone 4th order IMD products | \|3 * fx_low − fy_high\| | \|3 * fx_high − fy_low\| | \|3 * fy_low − fx_high\| | \|3 * fy_high − fx_low\| |
| IMD frequency limit (MHz) | 1430 | 1790 | 8870 | 9390 |

TABLE 19-continued

| UE UL carriers | fx_low | fx_high | fy_low | fy_high |
|---|---|---|---|---|
| Two-tone 4th order IMD products | \|3 * fx_low + fy_low\| | \|3 * fx_high + fy_high\| | \|3 * fy_low + fx_low\| | \|3 * fy_high + fx_high\| |
| IMD frequency limit (MHz) | 8680 | 9040 | 12360 | 12880 |
| Two-tone 4th order IMD products | \|2 * fx_low − 2 * fy_high\| | \|2 * fx_high − 2 * fy_low\| | \|2 * fx_low + 2 * fy_low\| | \|2 * fx high + 2 * fy_high\| |
| IMD frequency limit (MHz) | 3980 | 3540 | 10520 | 10960 |
| Two-tone 5th order IMD products | \|fx_low − 4 * fy_high\| | \|fx_high − 4 * fy_low\| | \|fy_low − 4 * fx_high\| | \|fy_high − 4 * fx_low\| |
| IMD frequency limit (MHz) | 13090 | 12420 | 3570 | 3140 |
| Two-tone 5th order IMD products | fx_low + 4 * fy_low | \|fx_high + 4 * fy_high\| | \|fy_low + 4 * fx_low\| | fy_high + 4 * fx_high\| |
| IMD frequency limit (MHz) | 15910 | 16580 | 10390 | 10820 |
| Two-tone 5th order IMD products | \|2 * fx_low − 3 * fy_high\| | 2 * fx_high − 3 * fy_low\| | \|2 * fy_low − 3 * fx_high\| | \|2 * fy_high − 3 * fx_low\| |
| IMD frequency limit (MHz) | 7680 | 7090 | 1760 | 2270 |
| Two-tone 5th order IMD products | \|2 * fx_low + 3 * fy_low\| | \|2 * fx_high + 3 * fy_high\| | \|2 * fy_low + 3 * fx_low\| | \|2 * fy_high + 3 * fx_high\| |
| IMD frequency limit (MHz) | 14070 | 14660 | 12230 | 12740 |

For 3 bands DL with 2 bands UL, own receiver desensitization study 2nd and 3rd order harmonics and 2nd, 3rd, 4th and 5th order intermodulation products were analyzed in Table 20. Co-existence study for UL CA band 2 and band 48 and DL CA band 2 and band 48 and band 66 is as Table 20.

TABLE 20

| UE UL carriers | fx_low | fx_high | fy_low | fy_high |
|---|---|---|---|---|
| UL frequency (MHz) | 1850 | 1910 | 3550 | 3700 |
| 2nd harmonics frequency limits | 2 * fx_low | 2 * fx_high | 2 * fy_low | 2 * fy_high |
| 2nd harmonics frequency limits (MHz) | 3700 | 3820 | 7100 | 7400 |
| 3rd harmonics frequency limits | 3 * fx_low | 3 * fx_high | 3 * fy_low | 3 * fy_high |
| 3rd harmonics frequency limits (MHz) | 5550 | 5730 | 10650 | 11100 |
| Two tone 2nd order IMD products | \|fy_low − fx_high\| | \|fy_high − fx_low\| | \|fy_low + fx_low\| | \|fy_high + fx_high\| |
| IMD frequency limit (MHz) | 1640 | 1850 | 5400 | 5610 |
| Two-tone 3rd order IMD products | \|2 * fx_low − fy_high\| | \|2 * fx_high − fy_low\| | \|2 * fy_low − fx_high\| | \|2 * fy_high − fx_low\| |
| IMD frequency limit (MHz) | 0 | 270 | 5190 | 5550 |
| Two-tone 3rd order IMD products | \|2 * fx_low + fy_low\| | \|2 * fx_high + fy_high\| | \|2 * fy_low + fx_low\| | \|2 * fy_high + fx_high\| |
| IMD frequency limit (MHz) | 7250 | 7520 | 8950 | 9310 |
| Two-tone 4th order IMD products | \|3 * fx_low − fy_high\| | \|3 * fx_high − fy_low\| | \|3 * fy_low − fx_high\| | \|3 * fy_high − fx_low\| |
| IMD frequency limit (MHz) | 1850 | 2180 | 8740 | 9250 |
| Two-tone 4th order IMD products | \|3 * fx_low + fy_low\| | \|3 * fx_high + fy_high\| | \|3 * fy_low + fx_low\| | \|3 * fy_high + fx_high\| |
| IMD frequency limit (MHz) | 9100 | 9430 | 12500 | 13010 |
| Two-tone 4th order IMD products | \|2 * fx_low − 2 * fy_high\| | \|2 * fx_high − 2 * fy_low\| | \|2 * fy_low + 2 * fy_low\| | \|2 * fx_high + 2 * fy_high\| |
| IMD frequency limit (MHz) | 3700 | 3280 | 10800 | 11220 |

TABLE 20-continued

| UE UL carriers | fx_low | fx_high | fy_low | fy_high |
|---|---|---|---|---|
| Two-tone 5th order IMD products IMD frequency limit (MHz) | \|fx_low − 4 * fy_high\| 12950 | \|fx_high − 4 * fy_low\| 12290 | \|fy_low − 4 * fx_high\| 4090 | \|fy_high − 4 * fx_low\| 3700 |
| Two-tone 5th order IMD products IMD frequency limit (MHz) | \|fx_low + 4 * fy_low\| 16050 | \|fx_high + 4 * fy_high\| 16710 | \|fy_low + 4 * fx_low\| 10950 | \|fy_high + 4 * fx_high\| 11340 |
| Two-tone 5th order IMD products IMD frequency limit (MHz) | \|2 * fx_low − 3 * fy_high\| 7400 | \|2 * fx_high − 3 * fy_low\| 6830 | \|2 * fy_low − 3 * fx_high\| 1370 | \|2 * fy_high − 3 * fx_low\| 1850 |
| Two-tone 5th order IMD products IMD frequency limit (MHz) | \|2 * fx_low + 3 * fy_low\| 14350 | \|2 * fx_high + 3 * fy_high\| 14920 | \|2 * fy_low + 3 * fx_low\| 12650 | \|2 * fy_high + 3 * fx_high\| 13130 |

For 3 bands DL with 2 bands UL, own receiver desensitization study 2nd and 3rd order harmonics and 2nd, 3rd, 4th and 5th order intermodulation products were analyzed in Table 21. Co-existence study for UL CA band 2 and band 66 and DL CA band 2 and band 48 and band 66 is as Table 21.

TABLE 21

| UE UL carriers | fx_low | fx_high | fy_low | fy_high |
|---|---|---|---|---|
| UL frequency (MHz) | 1850 | 1910 | 1710 | 1780 |
| 2nd harmonics frequency limits | 2 * fx_low | 2 * fx_high | 2 * fy_low | 2 * fy_high |
| 2nd harmonics frequency limits (MHz) | 3700 | 3820 | 3420 | 3560 |
| 3rd harmonics frequency limits | 3 * fx_low | 3 * fx_high | 3 * fy_low | 3 * fy_high |
| 3rd harmonics frequency limits (MHz) | 5550 | 5730 | 5130 | 5340 |
| Two tone 2nd order IMD products IMD frequency limit (MHz) | \|fy_low − fx_high\| 200 | \|fy_high − fx_low\| 70 | \|fy_low + fx_low\| 3560 | \|fy_high + fx_high\| 3690 |
| Two-tone 3rd order IMD products IMD frequency limit (MHz) | \|2 * fx_low − fy_high\| 1920 | \|2 * fx_high − fy_low\| 2110 | \|2 * fy_low − fx_high\| 1510 | \|2 * fy_high − fx_low\| 1710 |
| Two-tone 3rd order IMD products IMD frequency limit (MHz) | \|2 * fx_low + fy_low\| 5410 | \|2 * fx_high + fy_high\| 5600 | \|2 * fy_low + fx_low\| 5270 | \|2 * fy_high + fx_high\| 5470 |
| Two-tone 4th order IMD products IMD frequency limit (MHz) | \|3 * fx_low − fy_high\| 3770 | \|3 * fx_high − fy_low\| 4020 | \|3 * fy_low − fx_high\| 3220 | \|3 * fy_high − fx_low\| 3490 |
| Two-tone 4th order IMD products IMD frequency limit (MHz) | \|3 * fx_low + fy_low\| 7260 | \|3 * fx_high + fy_high\| 7510 | \|3 * fy_low + fx_low\| 6980 | \|3 * fy_high + fx_high\| 7250 |
| Two-tone 4th order IMD products IMD frequency limit (MHz) | \|2 * fx_low − 2 * fy_high\| 140 | \|2 * fx_high − 2 * fy_low\| 400 | \|2 * fx_low + 2 * fy_low\| 7120 | \|2 * fx_high + 2 * fy_high\| 7380 |
| Two-tone 5th order IMD products IMD frequency limit (MHz) | \|fx_low − 4 * fy_high\| 5270 | \|fx_high − 4 * fy_low\| 4930 | \|fy_low − 4 * fx_high\| 5930 | \|fy_high − 4 * fx_low\| 5620 |
| Two-tone 5th order IMD products IMD frequency limit (MHz) | \|fx_low + 4 * fy_low\| 8690 | \|fx_high + 4 * fy_high\| 9030 | \|fy_low + 4 * fx_low\| 9110 | \|fy_high + 4 * fx_high\| 9420 |

TABLE 21-continued

| UE UL carriers | fx_low | fx_high | fy_low | fy_high |
|---|---|---|---|---|
| Two-tone 5th order IMD products IMD frequency limit (MHz) | \|2 * fx_low − 3 * fy_high\| 1640 | \|2 * fx_high − 3 * fy_low\| 1310 | \|2 * fy_low − 3 * fx_high\| 2310 | \|2 * fy_high − 3 * fx_low\| 1990 |
| Two-tone 5th order IMD products IMD frequency limit (MHz) | \|2 * fx_low + 3 * fy_low\| 8830 | \|2 * fx_high + 3 * fy_high\| 9160 | \|2 * fy_low + 3 * fx_low\| 8970 | \|2 * fy_high + 3 * fx_high\| 9290 |

When uplink CA (band 48 and band 66) is paired with downlink CA (band 2 and band 48 and band 66), the 2nd and 5th order IMD products by band 48 and band 66 falls into the own Rx frequency band 2. In Table 6.16.1.3-1, evaluated MSD values of 3 bands (band 2 and band 48 and band 66) DL with 2 bands (band 48 and band 66) UL is as Table 22.

TABLE 22

E-UTRA Band/Channel bandwidth/NRB/Duplex mode

| EUTRA CA DL Configuration | EUTRA CA UL Configuration | EUTRA band | UL Fc (MHz) | UL BW (MHz) | UL CLRB | DL Fc (MHz) | DL BW (MHz) | MSD (dB) | Duplex mode | Source of IMD |
|---|---|---|---|---|---|---|---|---|---|---|
| CA_2A-48A-66A | CA_48A-66A | 2 | 1880 | 5 | 25 | 1960 | 5 | 28.3 | FDD-TDD | IMD2 |
|  |  | 48 | 3695 | 5 | 25 | 3695 | 5 | N/A |  |  |
| CA_2A-48C-66A |  | 66 | 1735 | 5 | 25 | 2135 | 5 | N/A |  |  |
|  |  | 2 | 1895 | 5 | 25 | 1975 | 5 | 0 |  | IMD5 |
|  |  | 48 | 3620 | 5 | 25 | 3620 | 5 | N/A |  |  |
|  |  | 66 | 1755 | 5 | 25 | 2155 | 5 | N/A |  |  |

When uplink CA (band 2 and band 48) is paired with downlink CA (band 2 and band 48 and band 66), the 4th order IMD product by band 2 and band 48 falls into the own Rx frequency band 66. In Table 6.16.1.4-2, evaluated MSD values of 3 bands (band 2 and band 48 and band 66) DL with 2 bands (Band 2 and band 48) UL is as Table 23.

TABLE 23

E-UTRA Band/Channel bandwidth/NRB/Duplex mode

| EUTRA CA DL Configuration | EUTRA CA UL Configuration | EUTRA band | UL Fc (MHz) | UL BW (MHz) | UL CLRB | DL Fc (MHz) | DL BW (MHz) | MSD (dB) | Duplex mode | Source of IMD |
|---|---|---|---|---|---|---|---|---|---|---|
| CA_2A-48A-66A | CA_2A-48A | 2 | 1905 | 5 | 25 | 1985 | 5 | N/A | FDD-TDD | IMD4 |
|  |  | 48 | 3560 | 5 | 25 | 3560 | 5 | N/A |  |  |
| CA_2A-48C-66A |  | 66 | 1755 | 5 | 25 | 2155 | 5 | 12.1 |  |  |

CA configurations under study in LTE-A inter-band CA: Band 2 and Band 5 and Band 48 DL with 2 bands UL are as Table 24.

TABLE 24

E-UTRA CA configuration/Bandwidth combination set

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_2A-5A-48A | CA_5A-48A | 2 | Yes | Yes | Yes | Yes | Yes | Yes | 50 | 0 |
|  |  | 5 |  |  | Yes | Yes |  |  |  |  |
|  |  | 48 |  |  | Yes | Yes | Yes | Yes |  |  |

TABLE 24-continued

E-UTRA CA configuration/Bandwidth combination set

| E-UTRA CA Configuration | Uplink CA configurations | E-UTRA Bands | 1.4 MHz | 3 MHz | 5 MHz | 10 MHz | 15 MHz | 20 MHz | Maximum aggregated bandwidth [MHz] | Bandwidth combination set |
|---|---|---|---|---|---|---|---|---|---|---|
| CA_2A-5A-48C | CA_5A-48A | 2<br>5<br>48 | Yes | Yes | Yes<br>Yes<br>See CA_48C Bandwidth combination set 0 in Table 5.6A.1-1 | Yes<br>Yes | Yes | Yes | 70 | 0 |
| CA_2A-5A-48D | CA_5A-48A | 2<br>5<br>48 | Yes | Yes | Yes<br>Yes<br>See CA_48D Bandwidth combination set 0 in Table 5.6A.1-1 | Yes<br>Yes | Yes | Yes | 90 | 0 |
| CA_2A-5A-48C | CA_2A-5A | 2<br>5<br>48 | Ye | Yes | Yes<br>Yes<br>See CA_48C Bandwidth combination set 0 in Table 5.6A.1-1 | Yes<br>Yes | Yes | Yes | 70 | 0 |
| CA_2A-5A-48D | CA_2A-5A | 2<br>5<br>48 | Ye | Yes | Yes<br>Yes<br>See CA_48D Bandwidth combination set 0 in Table 5.6A.1-1 | Yes<br>Yes | Yes | Yes | 90 | 0 |

For 3 bands DL with 2 bands UL, own receiver desensitization study 2nd and 3rd order harmonics and 2nd, 3rd, 4th and 5th order intermodulation products were analyzed in Table 25. Co-existence study for UL CA band 5 and band 48 and DL CA band 2 and band5 and band 48 is as Table 25.

TABLE 25

| UE UL carriers | fx_low | fx_high | fy_low | fy_high |
|---|---|---|---|---|
| UL frequency (MHz) | 824 | 849 | 3550 | 3700 |
| 2nd harmonics frequency limits | 2 * fx_low | 2 * fx_high | 2 * fy_low | 2 * fy_high |
| 2nd harmonics frequency limits (MHz) | 1648 | 1698 | 7100 | 7400 |
| 3rd harmonics frequency limits | 3 * fx_low | 3 * fx_high | 3 * fy_low | 3 * fy_high |
| 3rd harmonics frequency limits (MHz) | 2472 | 2547 | 10650 | 11100 |
| Two tone 2nd order IMD products | \|fy_low − fx_high\| | \|fy_high − fx_low\| | \|fy_low + fx_low\| | \|fy_high + fx_high\| |
| IMD frequency limit (MHz) | 2701 | 2876 | 4374 | 4549 |
| Two-tone 3rd order IMD products | \|2 * fx_low − fy_high\| | \|2 * fx_high − fy_low\| | \|2 * fy_low − fx_high\| | \|2 * fy_high − fx_low\| |
| IMD frequency limit (MHz) | 2052 | 1852 | 6251 | 6576 |
| Two-tone 3rd order IMD products | \|2 * fx_low + fy_low\| | \|2 * fx_high + fy_high\| | \|2 * fy_low + fx_low\| | \|2 * fy_high + fx_high\| |
| IMD frequency limit (MHz) | 5198 | 5398 | 7924 | 8249 |
| Two-tone 4th order IMD products | \|3 * fx_low − fy_high\| | \|3 * fx_high − fy_low\| | \|3 * fy_low − fx_high\| | \|3 * fy_high − fx_low\| |
| IMD frequency limit (MHz) | 1228 | 1003 | 9801 | 10276 |
| Two-tone 4th order IMD products | \|3 * fx_low + fy_low\| | \|3 * fx_high + fy_high\| | \|3 * fy_low + fx_ow\| | \|3 * fy_high + fx_high\| |
| IMD frequency limit (MHz) | 6022 | 6247 | 11474 | 11949 |
| Two-tone 4th order IMD products | \|2 * fx_low − 2 * fy_high\| | \|2 * fx_high − 2 * fy_low\| | \|2 * fx_low + 2 * fy_low\| | \|2 * fx_high + 2 * fy_high\| |
| IMD frequency limit (MHz) | 5752 | 5402 | 8748 | 9098 |

TABLE 25-continued

| UE UL carriers | fx_low | fx_high | fy_low | fy_high |
|---|---|---|---|---|
| Two-tone 5th order IMD products IMD frequency limit (MHz) | \|fx_low − 4 * fy_high\| 13976 | \|fx_high − 4 * fy_low\| 13351 | \|fy_low − 4 * fx_high\| 154 | \|fy_high − 4 * fx_low\| 404 |
| Two-tone 5th order IMD products IMD frequency limit (MHz) | \|fx_low + 4 * fy_low\| 15024 | \|fx_high + 4 * fy_high\| 15649 | \|fy_low + 4 * fx_low\| 6846 | \|fy_high + 4 * fx_high\| 7096 |
| Two-tone 5th order IMD products IMD frequency limit (MHz) | \|2 * fx_low − 3 * fy_high\| 9452 | \|2 * fx_high − 3 * fy_low\| 8952 | \|2 * fy_low − 3 * fx_high\| 4553 | \|2 * fy_high − 3 * fx_low\| 4928 |
| Two-tone 5th order IMD products IMD frequency limit (MHz) | \|2 * fx_low + 3 * fy_low\| 12298 | \|2 * fx_high + 3 * fy_high\| 12798 | \|2 * fy_low + 3 * fx_low\| 9572 | \|2 * fy_high + 3 * fx_high\| 9947 |

For 3 bands DL with 2 bands UL, own receiver desensitization study 2nd and 3rd order harmonics and 2nd, 3rd, 4th and 5th order intermodulation products were analyzed in Table 26. Co-existence study for UL CA band 2 and band 5 and DL CA band 2 and band 5 and band 48 is as Table 26.

TABLE 26

| UE UL carriers | fx_low | fx_high | fy_low | fy_high |
|---|---|---|---|---|
| UL frequency (MHz) | 1850 | 1910 | 824 | 849 |
| 2nd harmonics frequency limits | 2 * fx_low | 2 * fx_high | 2 * fy_low | 2 * fy_high |
| 2nd harmonics frequency limits (MHz) | 3700 | 3820 | 1648 | 1698 |
| 3rd harmonics frequency limits | 3 * fx_low | 3 * fx_high | 3 * fy_low | 3 * fy_high |
| 3rd harmonics frequency limits (MHz) | 5550 | 5730 | 2472 | 2547 |
| Two tone 2nd order IMD products IMD frequency limit (MHz) | \|fy_low − fx_high\| 1086 | \|fy_high − fx_low\| 1001 | \|fy_low + fx_low\| 2674 | \|fy_high + fx_high\| 2759 |
| Two-tone 3rd order IMD products IMD frequency limit (MHz) | \|2 * fx_low − fy_high\| 2851 | \|2 * fx_high − fy_low\| 2996 | \|2 * fy_low − fx_high\| 262 | \|2 * fy_high − fx_low\| 152 |
| Two-tone 3rd order IMD products IMD frequency limit (MHz) | \|2 * fx_low + fy_low\| 4524 | \|2 * fx_high + fy_high\| 4669 | \|2 * fy_low + fx_low\| 3498 | \|2 * fy_high + fx_high\| 3608 |
| Two-tone 4th order IMD products IMD frequency limit (MHz) | \|3 * fx_low − fy_high\| 4701 | \|3 * fx_high − fy_low\| 4906 | \|3 * fy_low − fx_high\| 562 | \|3 * fy_high − fx_low\| 697 |
| Two-tone 4th order IMD products IMD frequency limit (MHz) | \|3 * fx_low + fy_low\| 6374 | \|3 * fx_high + fy_high\| 6579 | \|3 * fy_low + fx_low\| 4322 | \|3 * fy_high + fx_high\| 4457 |
| Two-tone 4th order IMD products IMD frequency limit (MHz) | \|2 * fx_low − 2 * fy_high\| 2002 | \|2 * fx_high − 2 * fy_low\| 2172 | \|2 * fx_low + 2 * fy_low\| 5348 | \|2 * fx_high + 2 * fy_high\| 5518 |
| Two-tone 5th order IMD products IMD frequency limit (MHz) | \|fx_low − 4 * fy_high\| 1546 | \|fx_high − 4 * fy_low\| 1386 | \|fy_low − 4 * fx_high\| 6816 | \|fy_high − 4 * fx_low\| 6551 |
| Two-tone 5th order IMD products IMD frequency limit (MHz) | \|fx_low + 4 * fy_low\| 5146 | \|fx_high + 4 * fy_high\| 5306 | \|fy_low + 4 * fx_low\| 8224 | \|fy_high + 4 * fx_high\| 8489 |
| Two-tone 5th order IMD products IMD frequency limit (MHz) | \|2 * fx_low − 3 * fy_high\| 1153 | \|2 * fx_high − 3 * fy_low\| 1348 | \|2 * fy_low − 3 * fx_high\| 4082 | \|2 * fy_high − 3 * fx_low\| 3852 |

TABLE 26-continued

| UE UL carriers | fx_low | fx_high | fy_low | fy_high |
|---|---|---|---|---|
| Two-tone 5th order IMD products | \|2 * fx_low + 3 * fy_low\| | \|2 * fx_high + 3 * fy_high\| | \|2 * fy_low + 3 * fx_low\| | \|2 * fy_high + 3 * fx_high\| |
| IMD frequency limit (MHz) | 6172 | 6367 | 7198 | 7428 |

CA configurations under study LTE-A inter-band CA: Band 5 and Band 48 and Band 66 DL with 2 bands UL are as Table 27.

TABLE 27

E-UTRA CA configuration/Bandwidth combination set

| E-UTRA CA Configuratiom | Uplink CA configurations | E-UTRA Bands | 1.4 MHz | 3 MHz | 5 MHz | 10 MHz | 15 MHz | 20 MHz | Maximum aggregate bandwidth [MHz] | Bandwidth combination set |
|---|---|---|---|---|---|---|---|---|---|---|
| CA_5A-48A-66A | CA_5A-66A | 5 |  |  | Yes | Yes |  |  | 50 | 0 |
|  |  | 48 |  |  | Yes | Yes | Yes | Yes |  |  |
|  |  | 66 | Yes | Yes | Yes | Yes | Yes | Yes |  |  |
| CA_5A-48C-66A | CA_5A-66A | 5 |  |  | Yes | Yes |  |  | 70 | 0 |
|  |  | 48 |  |  | See CA_48C Bandwidth combination set 0 in Table 5.6A.1-1 | | | | | |
|  |  | 66 | Yes | Yes | Yes | Yes | Yes | Yes |  |  |
| CA_5A-48A-66A-66A | CA_5A-66A | 5 |  |  | Yes | Yes |  |  | 70 | 0 |
|  |  | 48 |  |  | Yes | Yes | Yes | Yes |  |  |
|  |  | 66 |  |  | See CA_66A-66A Bandwidth Combination Set 0 in Table 5.6A.1-3 | | | | | |
| CA_5A-48D-66A-66A | CA_5A-66A | 5 |  |  | Yes | Yes |  |  | 90 | 0 |
|  |  | 48 |  |  | See CA_48D Bandwidth combination set 0 in Table 5.6A.1-1 | | | | | |
|  |  | 66 |  |  | See CA_66A-66A Bandwidth Combination Set 0 in Table 5.6A.1-3 | | | | | |
| CA_5A-48C-66A-66A | CA_5A-66A | 5 |  |  | Yes | Yes |  |  | 90 | 0 |
|  |  | 48 |  |  | See CA_48C Bandwidth combination set 0 in Table 5.6A.1-1 | | | | | |
|  |  | 66 |  |  | See CA_66A-66A Bandwidth Combination Set 0 in Table 5.6A.1-3 | | | | | |

For 3 bands DL with 2 bands UL, own receiver desensitization study 2nd and 3rd order harmonics and 2nd, 3rd, 4th and 5th order intermodulation products were analyzed in Table 28. Co-existence study for UL CA band 5 and band 66 and DL CA band 5 and band 48 and band 66 is as Table 28.

TABLE 28

| UE UL carriers | fx_low | fx_high | fy_low | fy_high |
|---|---|---|---|---|
| UL frequency (MHz) | 824 | 849 | 1710 | 1780 |
| 2nd harmonics frequency limits | 2 * fx_low | 2 * fx_high | 2 * fy_low | 2 * fy_high |
| 2nd harmonics frequency limits (MHz) | 1648 | 1698 | 3420 | 3560 |
| 3rd harmonies frequency limits | 3 * fx_low | 3 * fx_high | 3 * fy_low | 3 * fy_high |
| 3rd harmonics frequency limits (MHz) | 2472 | 2547 | 5130 | 5340 |
| Two tone 2nd order IMD products | \|fy_low − fx_high\| | \|y_high − fx_low\| | \|fy_low + fx_low\| | \|fy_high + fx_high\| |
| IMD frequency limit (MHz) | 861 | 956 | 2534 | 2629 |

TABLE 28-continued

| UE UL carriers | fx_low | fx_high | fy_low | fy_high |
|---|---|---|---|---|
| Two-tone 3rd order IMD products IMD frequency limit (MHZ) | \|2 * fx_low − fy_high\| 132 | \|2 * fx_high − fy_low\| 12 | \|2 * fy_low − fx_high\| 2571 | \|2 * fy_high − fx_low\| 2736 |
| Two-tone 3rd order IMD products IMD frequency limit (MHZ) | \|2 * fx_low + fy_low\| 3358 | \|2 * fx_high + fy_high\| 3478 | \|2 * fy_low + ft_low\| 4244 | \|2 * fy_high + fx_high\| 4409 |
| Two-tone 4th order IMD products IMD frequency limit (MHz) | \|3 * fx_low − fy_high\| 692 | \|3 * fx_low − fy_low\| 837 | \|3 * fy_low − fx_high\| 4281 | \|3 * fy_high − fx_low\| 4516 |
| Two-tone 4th order IMD products IMD frequency limit (MHZ) | \|3 * fx_low + fy_low\| 4182 | \|3 * fx_high + fy_high\| 4327 | \|3 * fy_low + fx_low\| 5954 | \|3 * fy_high + fx_high\| 6189 |
| Two-tone 4th order IMD products IMD frequency limit (MHz) | \|2 * fx_low − 2 * fy_high\| 1912 | \|2 * fx_high − 2 * fy_low\| 1722 | \|2 * fx_low + 2 * fy_low\| 5068 | \|2 * fx_high + 2 * fy_high\| 5258 |
| Two-tone 5th order IMD products IMD frequency limit (MHz) | \|fx_low − 4 * fy_high\| 6296 | \|fx_high − 4 * fy_low\| 5991 | \|fy_low − 4 * fx_high\| 1686 | \|fy_high − 4 * fx_low\| 1516 |
| Two-tone 5th order IMD products IMD frequency limit | \|fx_low + 4 * fy_low\| 7664 | \|fx_high * 4 * fy_high\| 7969 | \|fy_low + 4 * fx_low\| 5006 | \|fy_high * 4 * fx_high\| 5176 |
| Two-tone 5th order IMD products IMD frequency limit (MHz) | \|2 * fx_low − 3 * fy_high\| 3692 | \|2 * fx_high − 3 * fy_low\| 3432 | \|2 * fy_low − 3 * fx_high\| 873 | \|2 * fy_high 3 * fx_low\| 1088 |
| Two-tone 5th order IMD products IMD frequency limit (MHz) | \|2 * fx_low + 3 * fy_low\| 6778 | \|2 * fx_high 3 * fy_high\| 7038 | \|2 * fy_low + 3 * fx_low\| 5892 | \|2 * fy_high + 3 * fx_high\| 6107 |

Hereinafter, an apparatus for maximum sensitivity degradation for carrier aggregation in a wireless communication system, according to some embodiments of the present disclosure, will be described.

For example, a base station may include a processor, a transceiver, and a memory.

For example, the processor may be configured to be coupled operably with the memory and the processor.

The processor may be configured to
control the transceiver to transmit an uplink signal via two bands among the plurality of E-UTRA operating bands, wherein the two bands are configured for uplink carrier aggregation (CA), and consists of a first band and a second band; and
control the transceiver to receive a downlink signal via one or more band from the three bands among the plurality of E-UTRA operating bands, wherein the three bands are configured for downlink CA, are consists of the first band, the second band, and a third band, wherein the plurality of E-UTRA operating bands include E-UTRA operating bands 2, 5, 13, 48, and 66, wherein the three bands include the two bands,
Wherein a pre-configured value of Maximum Sensitivity Degradation (MSD) is applied to a reference sensitivity of the third band.

Hereinafter, a processor for maximum sensitivity degradation for carrier aggregation in a wireless communication system, according to some embodiments of the present disclosure, will be described.

The processor may be configured to
control the transceiver to transmit an uplink signal via two bands among the plurality of E-UTRA operating bands, wherein the two bands are configured for uplink carrier aggregation (CA), and consists of a first band and a second band; and
control the transceiver to receive a downlink signal via one or more band from the three bands among the plurality of E-UTRA operating bands, wherein the three bands are configured for downlink CA, are consists of the first band, the second band, and a third band, wherein the plurality of E-UTRA operating bands include E-UTRA operating bands 2, 5, 13, 48, and 66, wherein the three bands include the two bands,
Wherein a pre-configured value of Maximum Sensitivity Degradation (MSD) is applied to a reference sensitivity of the third band.

Hereinafter, a non-transitory computer-readable medium has stored thereon a plurality of instructions for maximum sensitivity degradation for carrier aggregation in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a device.

The stored a plurality of instructions may cause the device to:
control the transceiver to transmit an uplink signal via two bands among the plurality of E-UTRA operating bands, wherein the two bands are configured for uplink carrier aggregation (CA), and consists of a first band and a second band; and
control the transceiver to receive a downlink signal via one or more band from the three bands among the plurality of E-UTRA operating bands, wherein the three bands are configured for downlink CA, are consists of the first band, the second band, and a third band,
wherein the plurality of E-UTRA operating bands include E-UTRA operating bands 2, 5, 13, 48, and 66,
wherein the three bands include the two bands,
wherein a pre-configured value of Maximum Sensitivity Degradation (MSD) is applied to a reference sensitivity of the third band The present disclosure may have various advantageous effects.

One of the effect is that UE is able to received downlink signal with lower sensitivity in band combination.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A device comprising:
a transceiver configured with a plurality of Evolved UMTS (Universal Mobile Telecommunications System) Terrestrial Radio Access (E-UTRA) operating bands; and
a processor operably connectable to the transceiver, the processer is configured to:
control the transceiver to transmit an uplink signal via two bands among the plurality of E-UTRA operating bands,
wherein the two bands are bands for carrier aggregation (CA); and
control the transceiver to receive a downlink signal via one or more band from the three bands among the plurality of E-UTRA operating bands,
wherein the three bands are configured for CA,
wherein the plurality of E-UTRA operating bands include E-UTRA operating bands 2, 5, 13, 48, and 66,
wherein the three bands include the two bands,
wherein a pre-configured value of Maximum Sensitivity Degradation (MSD) is applied to a reference sensitivity of the one or more band, and
wherein the pre-configured MSD value is 15.6 dB for receiving the downlink signal via band 2, based on the two bands being band 5 and 48, or
wherein the pre-configured MSD value is 16.6 dB for receiving the downlink signal via band 48, based on the two bands being band 2 and 5, or
wherein the pre-configured MSD value is 15.6 dB for receiving the downlink signal via band 2, based on the two bands being band 13 and 48, or
wherein the pre-configured MSD value is 32 dB for receiving the downlink signal via band 48, based on the two bands being band 2 and 66.

2. A method performed by a device operating in a wireless communication system, the method comprising:
transmitting an uplink signal via two bands among a plurality of Evolved UMTS (Universal Mobile Telecommunications System) Terrestrial Radio Access (E-UTRA) operating bands,
wherein the two bands are bands for carrier aggregation (CA);
receiving a downlink signal via one or more band from three bands among the plurality of E-UTRA operating bands,
wherein the three bands are bands for CA;
wherein the plurality of E-UTRA operating bands include E-UTRA operating bands 2, 5, 13, 48, and 66,
wherein a pre-configured value of Maximum Sensitivity Degradation (MSD) is applied to a reference sensitivity of the one or more band, and
wherein the pre-configured MSD value is 15.6 dB for receiving the downlink signal via band 2, based on the two bands being band 5 and 48, or
wherein the pre-configured MSD value is 16.6 dB for receiving the downlink signal via band 48, based on the two bands being band 2 and 5, or
wherein the pre-configured MSD value is 15.6 dB for receiving the downlink signal via band 2, based on the two bands being band 13 and 48, or
wherein the pre-configured MSD value is 32 dB for receiving the downlink signal via band 48, based on the two bands being band 2 and 66.

3. At least one computer readable medium (CRM) storing instructions that, based on being executed by at least one processor, perform operations comprising:
- transmitting an uplink signal via two bands among a plurality of Evolved UMTS (Universal Mobile Telecommunications System) Terrestrial Radio Access (E-UTRA) operating bands,
- wherein the two bands are bands for carrier aggregation (CA),
- receiving a downlink signal via one or more band from three bands among the plurality of E-UTRA operating bands,
- wherein the three bands are bands for CA,
- wherein the plurality of E-UTRA operating bands include E-UTRA operating bands 2, 5, 13, 48, and 66,
- wherein a pre-configured value of Maximum Sensitivity Degradation (MSD) is applied to a reference sensitivity of the one or more band,
- wherein the pre-configured MSD value is 15.6 dB for receiving the downlink signal via band 2, based on the two bands being band 5 and 48, or
- wherein the pre-configured MSD value is 16.6 dB for receiving the downlink signal via band 48, based on the two bands being band 2 and 5, or
- wherein the pre-configured MSD value is 15.6 dB for receiving the downlink signal via band 2, based on the two bands being band 13 and 48, or
- wherein the pre-configured MSD value is 32 dB for receiving the downlink signal via band 48, based on the two bands being band 2 and 66.

* * * * *